(12) United States Patent
Cheng

(10) Patent No.: US 11,242,127 B2
(45) Date of Patent: Feb. 8, 2022

(54) COMPOSITE STRINGER ASSEMBLY AND METHODS FOR TRANSMITTING A LOAD THROUGH A COMPOSITE STRINGER ASSEMBLY

(71) Applicant: The Boeing Company, Chicago, IL (US)

(72) Inventor: Jiangtian Cheng, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/855,689

(22) Filed: Apr. 22, 2020

(65) Prior Publication Data

US 2021/0331780 A1 Oct. 28, 2021

(51) Int. Cl.
*B64C 1/06* (2006.01)
*B64C 3/18* (2006.01)

(52) U.S. Cl.
CPC .............. *B64C 1/064* (2013.01); *B64C 3/182* (2013.01)

(58) Field of Classification Search
None
See application file for complete search history.

(56) References Cited

U.S. PATENT DOCUMENTS

| | | | |
|---|---|---|---|
| 9,370,921 B2 | 6/2016 | Butler et al. | |
| 9,463,880 B2 | 10/2016 | Vetter et al. | |
| 9,592,651 B2 | 3/2017 | Deobald et al. | |
| 10,099,445 B2 | 10/2018 | Kismarton | |
| 10,195,817 B2 | 2/2019 | Balabanov et al. | |
| 2002/0031641 A1 | 3/2002 | George et al. | |
| 2008/0290214 A1 | 11/2008 | Guzman et al. | |
| 2011/0315824 A1* | 12/2011 | Pook | B29C 70/443 244/133 |
| 2013/0189482 A1 | 7/2013 | Dequine | |
| 2014/0186588 A1* | 7/2014 | Victorazzo | B29C 70/865 428/178 |
| 2017/0274577 A1* | 9/2017 | Burns | B29C 70/443 |

OTHER PUBLICATIONS

Co-Pending U.S. Appl. No. 16/408,398, filed May 9, 2019.
Co-Pending U.S. Appl. No. 16/408,408, filed May 9, 2019.
Co-Pending U.S. Appl. No. 16/408,409, filed May 9, 2019.
Co-Pending U.S. Appl. No. 16/408,401, filed May 9, 2019.

(Continued)

*Primary Examiner* — Alexander S Thomas
(74) *Attorney, Agent, or Firm* — McDonnell Boehnen Hulbert & Berghoff LLP

(57) ABSTRACT

In an example, a composite stringer is described. The composite stringer includes a composite stringer and a base flange. The composite stringer includes a top flange, a first skin flange and a second skin flange configured to be coupled to a support structure, a first web extending between the first skin flange and a first side of the top flange, and a second web extending between the second skin flange and a second side of the top flange. The support structure includes at least one of a skin of a vehicle or a base charge. The base flange includes a bottom surface extending between the first skin flange and the second skin flange. The bottom surface of the base flange is configured to be coupled to the support structure. The base flange also includes a top surface extending between the first web and the second web.

20 Claims, 15 Drawing Sheets

(56) References Cited

OTHER PUBLICATIONS

Co-Pending U.S. Appl. No. 16/408,410, filed May 9, 2019.
Co-Pending U.S. Appl. No. 16/408,406, filed May 9, 2019.
Rouhi et al., "Design, manufacturing, and testing of a variable stiffness composite cylinder", Composite Structures, vol. 184, at pp. 146-152, published Jan. 15, 2018, available at https://www.sciencedirect.com/science/article/pii/S0263822317326089.
Gürdal, et al., "Variable stiffness composite panels: Effects of stiffness variation on the in-plane and buckling response," Composites: Part A, vol. 39, Issue 5, at pp. 911-922, published May 2008, available at: https://ac.els-cdn.com/S1359835X07002643/1-s2.0-S1359835X07002643-main.pdf?_tid=d46d133d-59c5-42b9-89da-5a4dd999bffc&acdnat=1536620823_6c694b3e5c1e4e9d506206958d02fb6d (Abstract Only).

\* cited by examiner

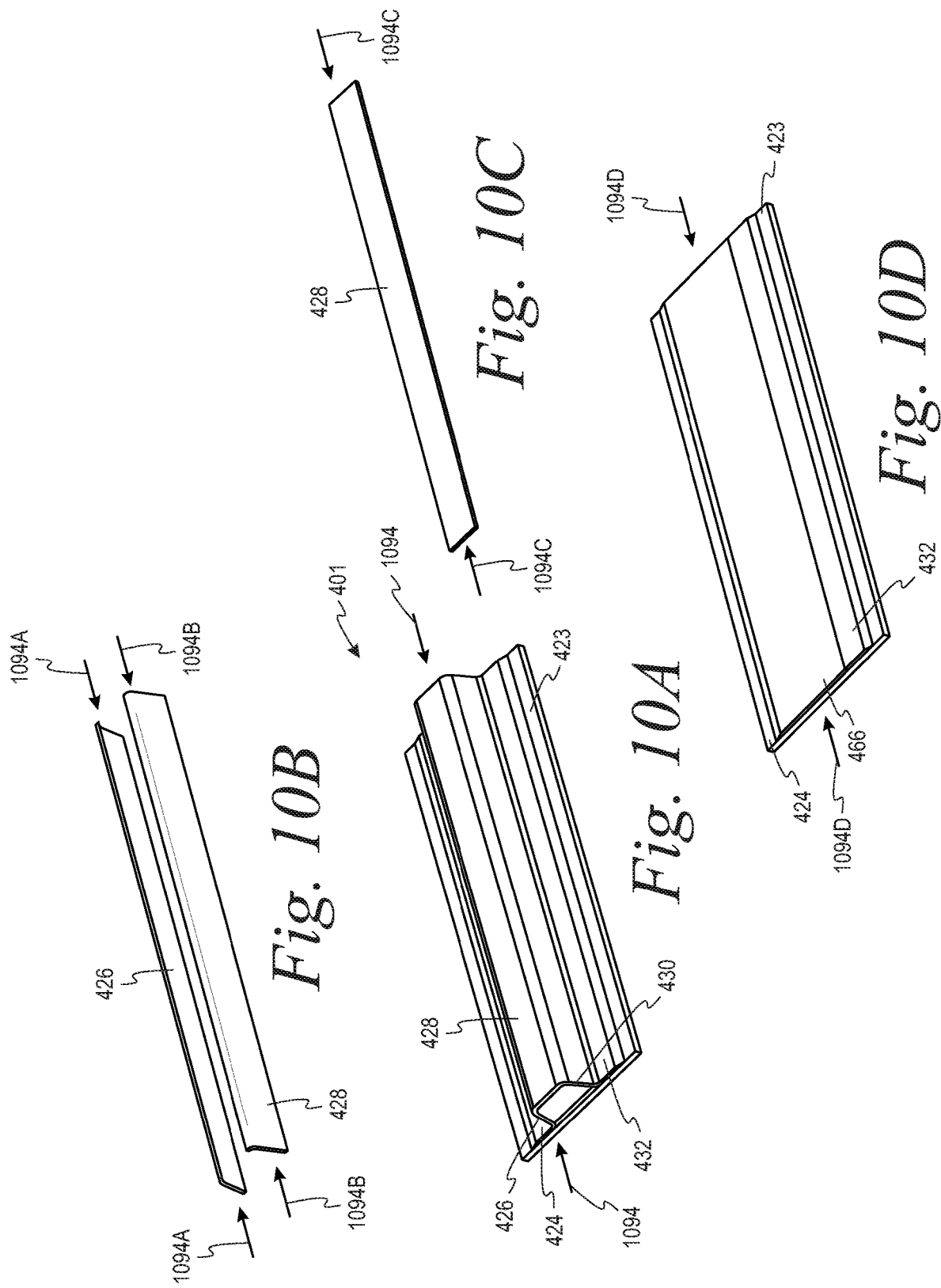

COMPOSITE STRINGER ASSEMBLY AND METHODS FOR TRANSMITTING A LOAD THROUGH A COMPOSITE STRINGER ASSEMBLY

FIELD

The present disclosure generally relates to composite structures and, more specifically, to composite stringer assemblies and methods for transmitting a load through composite stringer assemblies.

BACKGROUND

Various structural components are used to form a typical aircraft. For example, a stringer is an elongate member that can be coupled to one or more skin panels to help carry and/or transfer a load from the skin panel to another structure of the aircraft (e.g., a frame, a rib, and/or a spar of the aircraft). In this way, the stringer can help to prevent buckling under compression or shear loads on the skin panels, and/or mitigate bending of the skin panels. For these and other reasons, the aircraft typically includes one or more stringers in a fuselage, wing assemblies, and/or an empennage of the aircraft.

Increasingly, aircraft are incorporating composite materials to help make the aircraft, among other things, lighter and more fuel-efficient. In particular, for example, the stringers and the skin panels may be made of composite materials. A stringer made from a composite material may be referred to as a "composite stringer."

As an example, one type of composite material commonly used in the aerospace industry is carbon fiber reinforced plastic ("CFRP"). CFRP generally includes one or more composite layers or plies laminated together to form a sheet, laminate or layup. Each of the composite layers or plies can include a reinforcement material and a matrix material. The matrix material surrounds, binds and supports the reinforcement material. The reinforcement material provides structural strength to the matrix material and the CFRP. The matrix material is generally a non-conductive polymer such as an epoxy resin. The reinforcement material generally consists of strands of carbon fiber, which are electrically conductive.

As used herein, the term "composite structure" means a structure that is manufactured, fabricated or assembled, in whole or in part, from one or more components made from CFRP (i.e., CFRP components) including, without limitation, aerospace structures, such as aircraft ribs, spars, panels, fuselages, wings, wing boxes, fuel tanks and tail assemblies. In order to manufacture, assemble, form or fabricate a composite structure, CFRP sheets, laminates or layups may be cut or trimmed to a desired shape or size after the composite layers or plies are laid up, laminated and cured to form CFRP components.

SUMMARY

In an example, a composite stringer assembly is described. The composite stringer assembly includes a composite stringer and a base flange. The composite stringer includes a top flange having a first side and a second, and a first skin flange configured to be coupled to a support structure, a first web extending between the first skin flange and the first side of the top flange, a second skin flange configured to be coupled to the support structure, and a second web extending between the second skin flange and the second side of the top flange. The support structure includes at least one of a skin of a vehicle or a base charge.

The base flange includes a bottom surface extending between the first skin flange and the second skin flange. The bottom surface of the base flange is configured to be coupled to the support structure. The base flange also includes a top surface extending between the first web and the second web. The first skin flange, the first web, the top flange, the second web, the second skin flange, and the base flange include a plurality of plies of composite material.

In another example, a method of transmitting an in-plane shear load through a composite stringer assembly is described. The method includes transmitting, along a support structure, an in-plane shear load toward a composite stringer assembly coupled to the support structure. The support structure includes a skin of a vehicle. The composite stringer assembly includes a composite stringer including: (i) a top flange having a first side and a second side, (ii) a first skin flange coupled to the support structure, (iii) a first web extending between the first skin flange and the first side of the top flange, (iv) a second skin flange coupled to the support structure, and (v) a second web extending between the second skin flange and the second side of the top flange.

The composite stringer assembly also includes a base flange. The base flange includes (a) a bottom surface extending between the first skin flange and the second skin flange, wherein the bottom surface of the base flange is coupled to the support structure, and (b) a top surface extending between the first web and the second web. The first skin flange, the first web, the top flange, the second web, the second skin flange, and the base flange include a plurality of plies of composite material.

The method also includes transmitting at least a portion of the in-plane shear load continuously through the first skin flange, the base flange, and the second skin flange, and transmitting at least another portion of the in-plane shear load through the support structure coupled to the first skin flange, the base flange, and the second skin flange.

In another example, a method of transmitting an axial compression load through a composite stringer assembly. The method includes receiving an axial compression load on opposing ends of a composite stringer assembly. The composite stringer assembly includes a composite stringer and a base flange. The composite stringer includes: (i) a top flange having a first side and a second side, (ii) a first skin flange configured to be coupled to a support structure, (iii) a first web extending between the first skin flange and the first side of the top flange, (iv) a second skin flange configured to be coupled to the support structure, and (v) a second web extending between the second skin flange and the second side of the top flange. The support structure includes at least one of a skin of a vehicle or a base flange.

The base flange includes (a) a bottom surface extending between the first skin flange and the second skin flange, wherein the bottom surface of the base flange is coupled to the support structure, and (b) a top surface extending between the first web and the second web. The first skin flange, the first web, the top flange, the second web, the second skin flange, and the base flange include a plurality of plies of composite material.

The method also includes distributing a plurality of portions of the axial compression load among the first skin flange, the first web, the top flange, the second web, the second skin flange, and the base flange such that the first skin flange, the first web, the top flange, the second web, the second skin flange, and the base flange simultaneously carry the axial compression load together as an integrated structure.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 10A depicts a perspective view of a composite stringer assembly under an axial compression load, according to an example.

FIG. 10B depicts a first web and a second web of the composite stringer assembly under the axial compression load shown in FIG. 10A, according to an example.

FIG. 10C depicts a top flange of the composite stringer assembly under the axial compression load shown in FIG. 10A, according to an example.

FIG. 10D depicts a first skin flange, a second skin flange, and a base flange of the composite stringer assembly under the axial compression load shown in FIG. 10A, according to an example.

DETAILED DESCRIPTION

Figure 1:
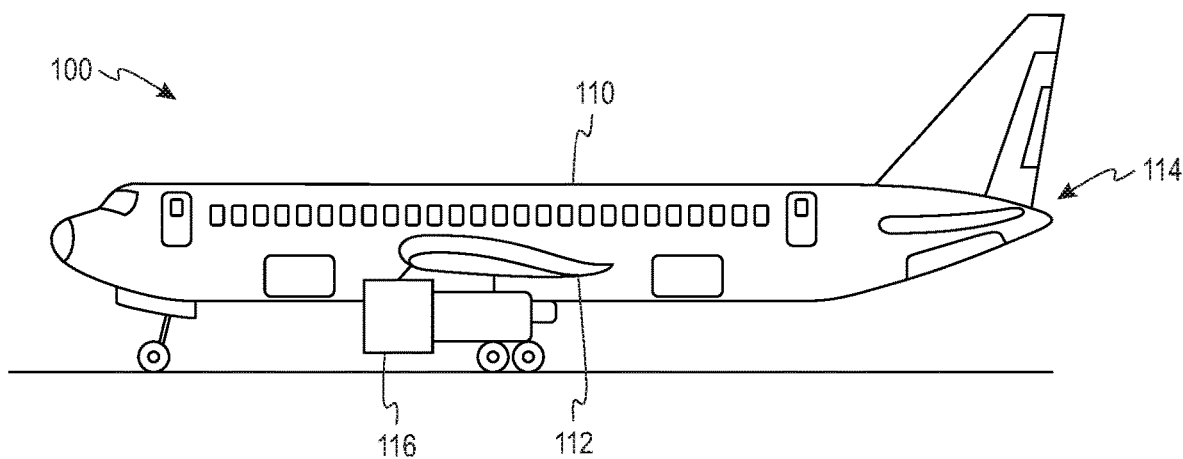
FIG. 1 depicts a side view of an aircraft, according to an example.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the term "approximately" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

By the term "substantially constant" with reference to a amounts or measurement values described herein, it is meant that the recited characteristic, parameter, or value remains substantially unchanged, but that deviations or variations, including for example, tolerances, measurement error, measurement accuracy limitations and other factors known to those of skill in the art, may occur in amounts that do not preclude the effect the characteristic was intended to provide.

As used herein, the terms "greater than" and "less than" are intended to have their common meaning. Thus, a first value is greater than a second value if the first value is greater than the second value by any amount. Similarly, a first value is less than a second value if the first value is less than the second value by any amount. As used herein, the terms "first" and "second" are intended to distinguish or identify distinct features are not intended to limit a number or order of such features.

As noted above, aircraft generally include one or more composite stringers coupled to one or more skin panels to help carry and/or transfer a load from the skin panels to another structure of the aircraft (e.g., a frame, a rib, and/or a spar of the aircraft). The composite stringers may be formed in a plurality of different shapes and/or sizes. For instance, some types of composite stringers include at least a top flange having a first side and a second side, a first skin flange that is configured to couple to a support structure (e.g., a skin panel), a first web extending between the first skin flange and the first side of the top flange, a second skin flange configured that is configured to couple to the support structure, and a second web extending between the second skin flange and the second side of the top flange. One example of this type of composite stringer is a "hat-shaped stringer".

When the first skin flange and the second skin flange are coupled to the support structure, the support structure extends in a first plane while the first skin flange and the second skin flange are arranged in a second plane that is generally parallel to the first plane in which the support structure is arranged. By contrast, the first web and the second web generally extend along respective planes that are transverse to the first plane and the second plane. To transition from the first skin flange to the first web and the second skin flange to the second web, the composite stringers can also include a first lower corner extending from the first skin flange to the first web, and a second lower corner extending from the second skin flange to the second web. The first lower corner and the second lower corner can have a curved shape to transition from the first skin flange to the first web and the second skin flange to the second web, respectively.

In this arrangement, the curvature of the first lower corner portion and/or the second lower corner portion can form a void region between (i) the support structure and (ii) the first lower corner portion and/or at the second lower corner portion. Such void region(s) may be referred to as "radius filler regions" or "noodle regions". For some conventional composite stringer assemblies, the radius filler regions may be prone to cracking and/or delamination. To strengthen and/or improve a durability of the composite stringer, a radius filler formed of a composite material (e.g., CFRP) and/or an adhesive/epoxy material, and having a generally triangular cross-sectional shape may be positioned in the radius filler regions. The combination of the composite stringer and the radius fillers can form a composite stringer assembly that assists in bearing and/or transmitting a load on the support structure.

Although the radius filler can help strengthen and improve the durability of the composite stringer, the load bearing and/or load transmitting capabilities of the composite stringer assemblies can be further improved. For instance, when the radius fillers are provided in the radius filler regions, there is a gap between (i) the first skin flange, the first web, and the radius filler coupled to the first lower corner and (ii) the second skin flange, the second web, and the radius filler coupled to the second lower corner portion. As such, there is a discontinuity between portions of the composite stringer assembly along the support structure (e.g., along the second plane between the first skin flange and the second skin flange). This discontinuity can contribute to limitations on the load bearing and/or load transmission performance of the composite stringer assembly.

Example composite stringer assemblies and methods described herein can address at least some limitations of existing composite stringers. For instance, within examples, a composite stringer assembly includes a composite stringer and a base flange. The composite stringer includes a top flange having a first side and a second, and a first skin flange configured to be coupled to a support structure, a first web extending between the first skin flange and the first side of the top flange, a second skin flange configured to be coupled to the support structure, and a second web extending between the second skin flange and the second side of the top flange. The support structure includes at least one of a skin of a vehicle or a base charge.

The base flange includes a bottom surface extending between the first skin flange and the second skin flange. The bottom surface of the base flange is configured to be coupled to the support structure. The base flange also includes a top surface extending between the first web and the second web. The first skin flange, the first web, the top flange, the second web, the second skin flange, and the base flange include a plurality of plies of composite material.

In this arrangement, the base flange can provide a continuous structural connection between (i) the first skin flange and the second skin flange and (ii) the first web and the second web. As a result, the base flange reinforces the first skin flange, the second skin flange, the first web, and the second web to inhibit the composite stringer delaminating from the support structure. The base flange, the first skin flange, the second skin flange, the first web, and the second web also collectively work together to transmit greater in-plane shear loads and/or greater axial compression loads through the composite stringer assembly compared to conventional composite stringer assemblies that use the radius fillers. Additionally or alternatively, the load transmission benefits provided by the base flange can help to address other performance-limiting conditions such as, for instance, thermal distortion and/or fabrication artifacts.

Referring now to FIG. 1, a side view of an aircraft 100 is depicted, according to an example. As shown in FIG. 1, the aircraft 100 can include a plurality of assemblies such as, for example, a fuselage 110, a plurality of wing assemblies 112, and an empennage 114. One or more propulsion units 116 can be coupled to the wing assemblies 112, the fuselage 110, and/or other portions of the aircraft 100. Although the aircraft 100 shown in FIG. 1 is generally representative of a commercial passenger aircraft, the teachings of the present disclosure can be applied to other passenger aircraft, cargo aircraft, military aircraft, rotorcraft, and other types of vehicles such as, for examples, aerospace vehicles (e.g., satellites, space launch vehicles, and/or rockets), watercraft, trains, automobiles, trucks, buses, or other suitable structures having one or more composite stringers.

Within examples, the fuselage 110, the wing assemblies 112, and/or the empennage 114 can include one or more composite structures. In general, a composite structure is a structure that is formed from a plurality of composite materials that are bound together with sufficient strength that the composite materials act as a single unit from a structural point of view. A composite material (also called a composition material or shortened to composite, which is the common name) is a material made from two or more constituent materials with significantly different physical or chemical properties that, when combined, produce a material with characteristics different from the individual components.

Figure 2:
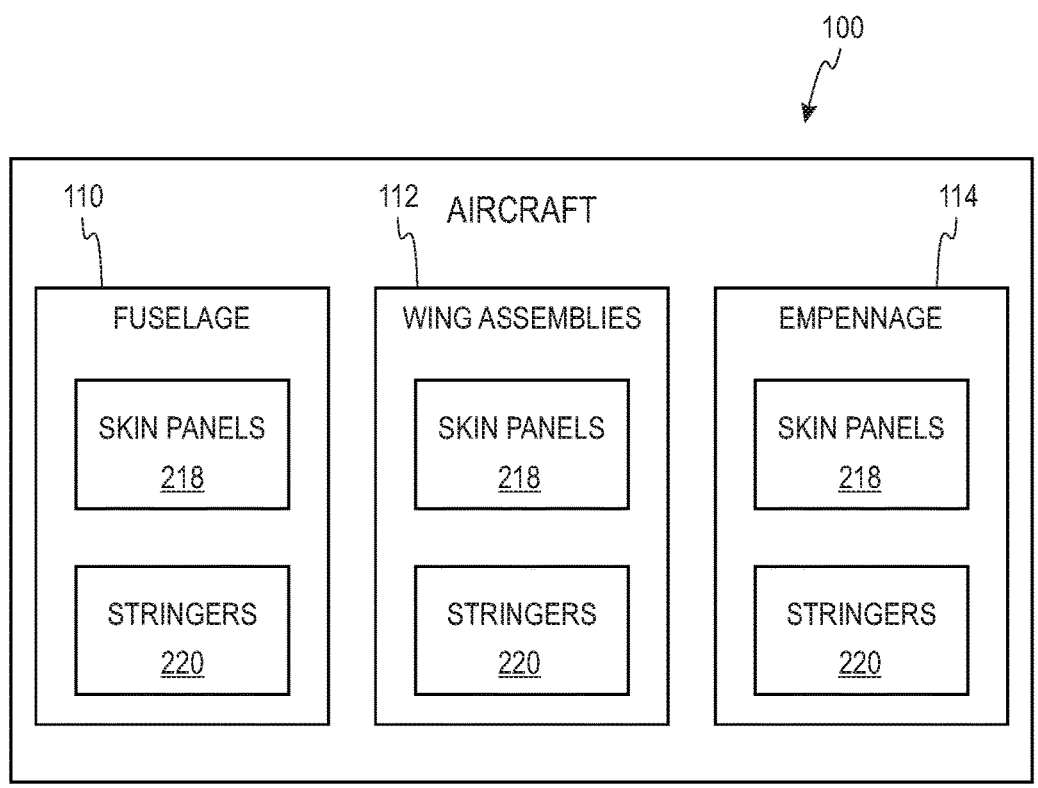
FIG. 2 depicts a simplified block diagram of the aircraft, according to an example.

FIG. 2 is a simplified block diagram of the aircraft 100, including the fuselage 110, the wing assemblies 112, and the empennage 114, according to an example. As shown in FIGS. 1-2, the fuselage 110, the wing assemblies 112, and the empennage 114 can each include one or more skin panels 218 and one or more composite stringers 220. As noted above, the composite stringers 220 are configured to provide a predetermined flexural and torsional stiffness to the fuselage 110, the wing assemblies 112, and the empennage 114. For example, the composite stringers 220 can be configured to transfer bending loads in the skin panels 218, and stiffen the skin panels 218 so that the skin panels 218 do not buckle under loading.

Although FIG. 2 depicts the composite stringers 220 for the fuselage 110, the wing assemblies 112, and the empennage 114, the aircraft 100 can include the composite stringers 220 in one or more other assemblies of the aircraft 100 to stiffen and/or transfer loads on those other assemblies. Within examples, the composite stringers 220 in the fuselage 110, the wing assemblies 112, and the empennage 114 may be subject to uniaxial tension and compression and out-of-plane bending. The composite stringers 220 in the fuselage 110, the wing assemblies 112, and the empennage 114 may also be subject to additional loads including shear and pull off loads. A component under compression tends to twist, cripple and buckle. The composite stringers 220 provide strength, resist compression and tension, and provide stability against twisting, crippling, and buckling forces. For example, the composite stringers 220 can provide support structures within the fuselage 110, the wing assemblies 112, or the empennage 114 that may brace against various exerted forces.

Figure 3A:
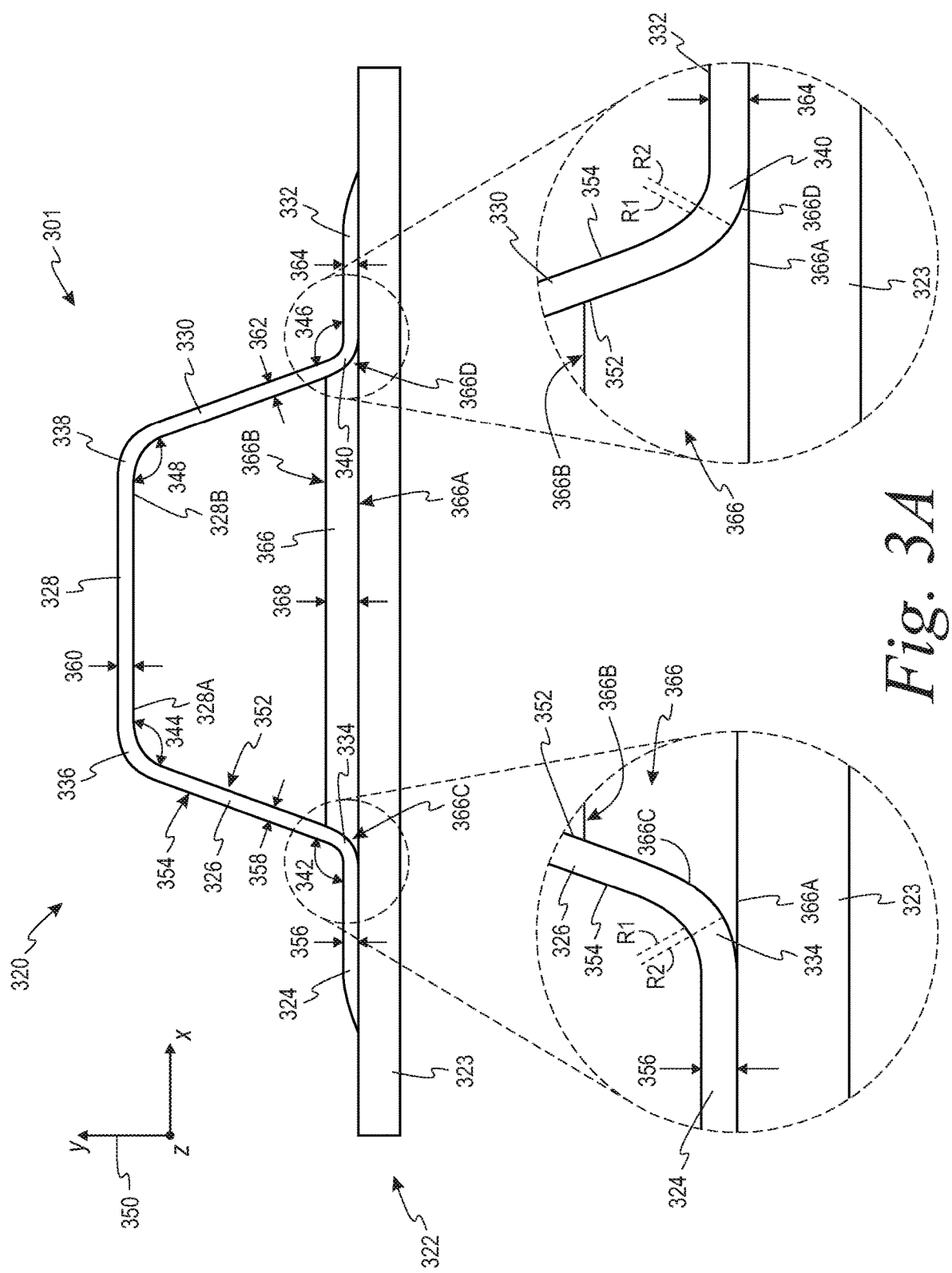
FIG. 3A depicts a side view of a composite structure assembly, according to an example.
Figure 3B:
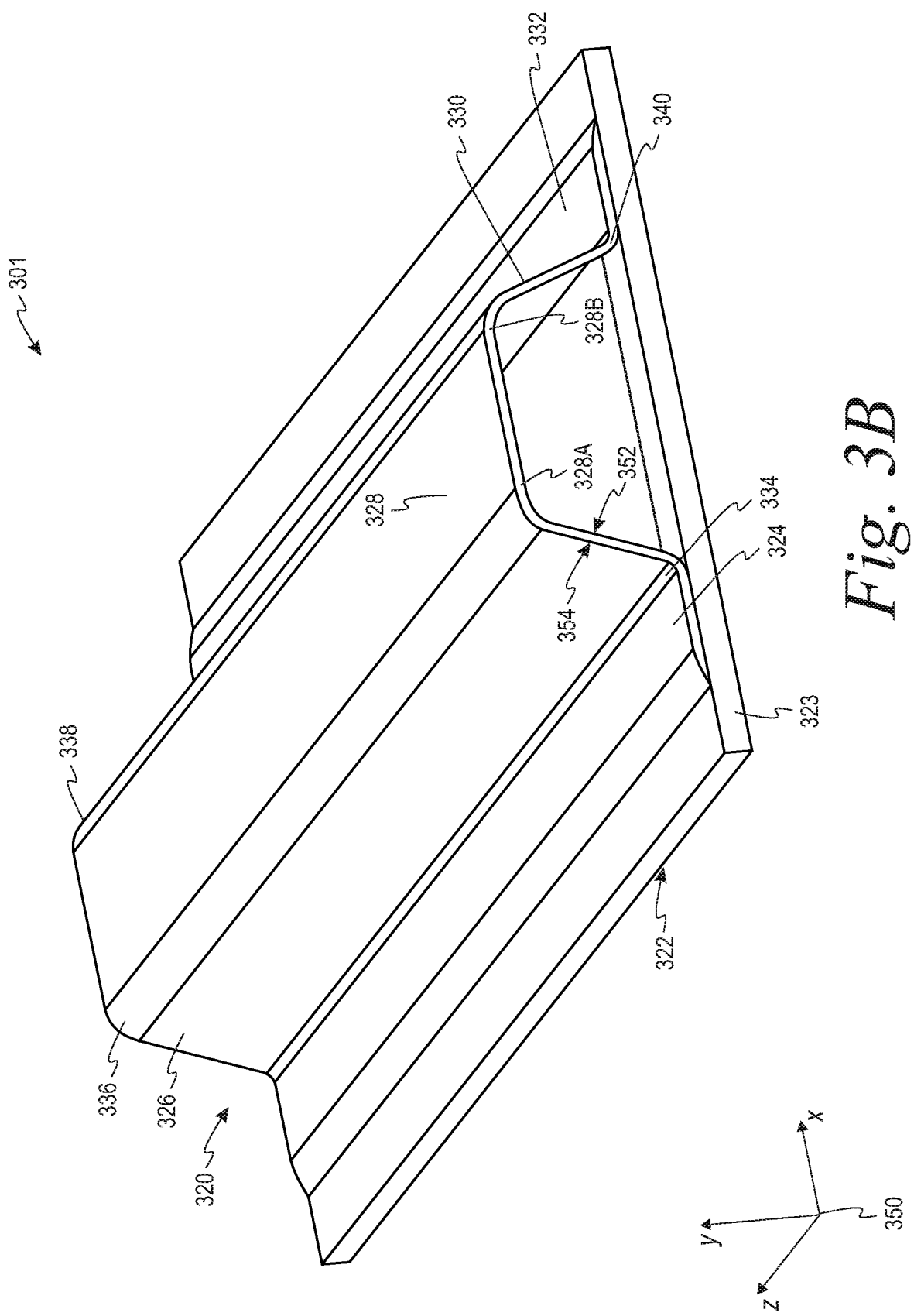
FIG. 3B depicts a perspective view of the composite structure assembly shown in FIG. 3A, according to an example.

Referring now to FIGS. 3A-3B, a composite stringer assembly 301 including a composite stringer 320 coupled to a support structure 322 is illustrated according to an example. In particular, FIG. 3A depicts a side view of the composite stringer 320 and the support structure 322, and FIG. 3B depicts a perspective view of the composite stringer 320 and the support structure 322.

As shown in FIGS. 3A-3B, the composite stringer 320 includes a first skin flange 324, a first web 326, a top flange 328, a second web 330, and a second skin flange 332. The top flange 328 includes a first side 328A and a second side 328B. The first web 326 extends between the first skin flange 324 and the first side 328A of the top flange 328. The first skin flange 324 is configured to be coupled to the support structure 322. The second web 330 extends between the second skin flange 332 and the second side 328B of the top flange 328. The second skin flange 332 is also configured to be coupled to the support structure 322.

As noted above, the first skin flange 324 and the second skin flange 332 are configured to be coupled to the support structure 322. For example, the first skin flange 324 and the second skin flange 332 can extend in a plane that is substantially parallel to a surface of the support structure 322 to which the first skin flange 324 and the second skin flange 332 are coupled. This can help to promote a relatively strong bond between the composite stringer 320 and the support structure 322 at an interface between (i) the first skin flange 324 and the second skin flange 332 and (ii) the support structure 322 due, at least in part, to a relatively large surface area of the interface.

In FIGS. 3A-3B, the support structure 322 is a skin 323 of a vehicle (e.g., the skin panel 210 of the fuselage 110, the wing assemblies 112, and/or the empennage 114). However, as described below, the support structure 322 can additionally or alternatively include a base charge coupled to the skin 323 of the vehicle. The base charge can include a plurality of plies of composite material and can be used, for example, to help support and cushion the composite stringer 320 on the skin 323. Thus, more generally, the support structure 322 can include at least one of the skin 323 of the vehicle or the base charge.

As shown in FIGS. 3A-3B, the composite stringer 320 can further include one or more corner portions, which each provides a transition section between two other portions of the composite stringer 320 (i.e., between two of the first skin flange 324, the first web 326, the top flange 328, the second web 330, and the second skin flange 332). For instance, in FIGS. 3A-3B, the corner portion(s) of the composite stringer 320 can include (i) a first lower corner portion 334 extending from the first skin flange 324 to the first web 326, (ii) a first upper corner portion 336 extending from the first web 326 to the top flange 328, (iii) a second lower corner portion 340 extending from the second skin flange 332 to the second web 330, and/or (iv) a second upper corner portion 338 extending from the second web 330 to the top flange 328. In implementations in which the composite stringer 320 includes two or more corner portions, the term "lower" means closer to the support structure 322 than the top flange 328 when the composite stringer 320 is coupled to the support structure 322, and the term "upper" means closer to the top flange 328 than the support structure 322 when the composite stringer 320 is coupled to the support structure 322. However, in implementations in which the composite stringer 320 includes a single corner portion, the terms "lower" and "upper" may be used interchangeably unless context dictates otherwise.

In general, the first lower corner portion 334 can provide a transition section between the first skin flange 324 and the first web 326, whereas the first upper corner portion 336 can provide a transition section between the first web 326 and the top flange 328. Similarly, the second lower corner portion 340 can provide a transition section between the second skin flange 332 and the second web 330, whereas the second upper corner portion 338 can provide a transition section between the second web 330 and the top flange 328.

For example, in FIGS. 3A-3B, the first skin flange 324, the first web 326, the top flange 328, the second web 330, and the second skin flange 332 can be planar structures that each extend in a respective plane in space. The respective planes in which the first skin flange 324, the first web 326, the top flange 328, the second web 330, and the second skin flange 332 extend can be different from each other. As such, the first lower corner portion 334, the first upper corner portion 336, the second lower corner portion 340, and/or the second upper corner portion 338 can include a curved shape and/or a bent shape that facilitates transitioning from one plane to another.

For instance, FIGS. 3A-3B indicates a coordinate system 350, and FIG. 3A depicts the composite stringer assembly 301 in an X-Y plane of the coordinate system 350. As shown in FIGS. 3A-3B, the first skin flange 324, the top flange 328, and the second skin flange 332 each extend in a respective plane parallel to an X-Z plane of the coordinate system 350, whereas the first web 326 and the second web 330 can each extend in a respective plane that is transverse to the X-Z plane of the coordinate system 350. In this arrangement, the first lower corner portion 334 can define an angle 342 between the first skin flange 324 and the first web 326, the first upper corner portion 336 can define an angle 344 between the first web 326 and the top flange 328, the second lower corner portion 340 can define an angle 346 between the second skin flange 332 and the second web 330, and the second upper corner portion 338 can define an angle 348 between the second skin flange 332 and the second web 330.

In one example, the angle 342 between the first skin flange 324 and the first web 326 can be between approximately 110 degrees and approximately 140 degrees, and the angle 346 between the second skin flange 332 and the second web 330 can be between approximately 110 degrees and approximately 140 degrees. In another example, the angle 342 and/or the angle 346 can be between approximately 40 degrees and approximately 70 degrees. Additionally, in an example, the angle 344 between the first web 326 and the top flange 328 can be between approximately 110 degrees and approximately 140 degrees, and the angle 348 between the second web 330 and the top flange 328 can be between approximately 110 degrees and approximately 140 degrees. In another example, the angle 344 and/or the angle 348 can be between approximately 40 degrees and approximately 70 degrees. These example angles can help to provide sufficient load bearing performance under expected operating conditions for an aircraft.

Additionally, as shown in FIGS. 3A-3B, the composite stringer 320 can include an inner surface 352 extending along the first skin flange 324, the first lower corner portion 334, the first web 326, the first upper corner portion 336, the top flange 328, the second upper corner portion 338, the second web 330, the second lower corner portion 340, and the second skin flange 332. The inner surface 352 faces the support structure 322 when the first skin flange 324 and the second skin flange 332 are coupled to the support structure 322. The composite stringer 320 also includes an outer surface 354 extending along the first skin flange 324, the first lower corner portion 334, the first web 326, the first upper corner portion 336, the top flange 328, the second upper corner portion 338, the second web 330, the second lower corner portion 340, and the second skin flange 332. The outer surface 354 faces away from the support structure 322 when the first skin flange 324 and the second skin flange 332 are coupled to the support structure 322.

In general, a load bearing performance of the composite stringer assembly 301 is, at least in part, related to a gage of one or more portions of the composite stringer. The gage of a given portion of the composite stringer 320 is a measurement of a thickness between the inner surface 352 and the outer surface 354 of the given portion. For example, in FIGS. 3A-3B, the first skin flange 324 has a first gage 356, the first web 326 has a second gage 358, the top flange 328 has a third gage 360, the second web 330 has a fourth gage 362, and the second skin flange 332 has a fifth gage 364. Accordingly, the first gage 356, the second gage 358, the third gage 360, the fourth gage 362, and the fifth gage 364 are respective thicknesses between the inner surface 352 and the outer surface 354 at the first skin flange 324, the first web 326, the top flange 328, the second web 330, and the second skin flange 332, respectively In FIGS. 3A-3B, the first skin flange 324, the first web 326, the top flange 328, the second web 330, and the second skin flange 332 are all formed with a common or substantially equal gage. As such, the first gage 356, the second gage 358, the third gage 360, the fourth gage 362, and the fifth gage 364 can be approximately equal to each other. Forming the first skin flange 324, the first web 326, the top flange 328, the second web 330, and the second skin flange 332 with a common gage or substantially equal gage can help to simplify a manufacturing process for forming the composite stringer 320. However, as described below with respect to FIGS. 4A-4B, the first skin flange 324, the first web 326, the top flange 328, the second web 330, and the second skin flange 332 can be formed with a variable gage such that at least one of the first skin flange 324, the first web 326, the top flange 328, the second web 330, and the second skin flange 332 has a different gage than at least another one of the first skin flange 324, the first web 326, the top flange 328, the second web 330, and the second skin flange 332. Also, as described below, forming a composite stringer with a variable gage can provide several performance improvements and benefits relative to the composite stringer 320 formed with a common gage.

As shown in FIGS. 3A-3B, the composite stringer assembly 301 also includes a base flange 366. The base flange 366 includes a bottom surface 366A extending between the first skin flange 324 and the second skin flange 332, and a top surface 366B extending between the first web 326 and the second web 330. The bottom surface 366A of the base flange 366 is configured to be coupled to the support structure 322. In this arrangement, the bottom surface 366A of the base flange 366 can provide a continuous structural connection over an entirety of the gap between the first skin flange 324 and the second skin flange 332, and the top surface 366B of the base flange 366 can provide a continuous structural connection over an entirety of the gap between the first web 326 and the second web 330. As a result, the base flange 366 reinforces the first skin flange 324, the second skin flange 332, the first web 326, and the second web 330 to inhibit the composite stringer 320 delaminating from the support structure 322.

Additionally, in this arrangement, the base flange 366, the first skin flange 324, the second skin flange 332, the first web 326, and the second web 330 collectively work together to transmit greater in-plane shear loads and/or greater axial compression loads through the composite stringer assembly 301 compared to conventional composite stringer assemblies that use radius fillers at the first lower corner portion 334 and the second lower corner portion 340. As such, the base flange 366 is configured to transfer an in-plane shear load from the first skin flange 324 to the second skin flange 332 as shown and described in further detail below with respect to FIGS. 9A-9B, and the base flange 366 is configured to transfer an axial compression load as shown and described in further detail below with respect to FIG. 10A-10D.

As shown in FIGS. 3A-3B, the base flange 366 can have a sixth gage 368. The sixth gage 368 is a thickness between the top surface 366B and the bottom surface 366A of the base flange 366. The sixth gage 368 of the base flange 366 is greater than the first gage 356 of the first skin flange 324 and the fifth gage 364 of the second skin flange 332. This provides for arranging (i) the bottom surface 366A of the base flange 366 extending between the first skin flange 324 and the second skin flange 332 (ii) while the top surface 366B of the base flange 366 extends between the first web 326 and the second web 330 as described above.

As noted above, the bottom surface 366A of the base flange 366 is configured to couple to the support structure 322. For example, the bottom surface 366A of the base flange 366 can extend in a plane that is substantially parallel to the surface of the support structure 322 to which the bottom surface 366A of the base flange 366 is coupled. This can help to further promote a relatively strong bond between the composite stringer assembly 301 and the support structure 322 at an interface between the base flange 366 and the support structure 322 due, at least in part, to a relatively large surface area of the interface.

Additionally, as shown in FIGS. 3A-3B, the base flange 366 can include a first lateral surface 366C extending between the top surface 366B and the bottom surface 366A of the base flange 366, and a second lateral surface 366D extending between the top surface 366B and the bottom surface 366A of the base flange 366. The first lateral surface 366C is coupled to the first lower corner portion 334 of the composite stringer 320, and the second lateral surface 366D is coupled to the second lower corner portion 340 of the composite stringer 320. This can help to increase the support provided by the base flange 366 to the composite stringer 320. For instance, coupling the base flange 366 to the composite stringer 320 in this manner can assist in transmitting greater in-plane shear loads and/or greater axial compression loads through the composite stringer assembly 301 compared to conventional composite stringer assemblies that use radius fillers at the first lower corner portion 334 and the second lower corner portion 340.

As described above, the first lower corner portion 334 can include a curved shape and/or a bent shape that facilitates transitioning from the first skin flange 324 to the first web 326, and the second lower corner portion 340 can include a curved shape and/or a bent shape that facilitates transitioning from the second skin flange 332 to the second web 330. In FIGS. 3A-3B, the first lateral surface 366C of the base flange 366 has a shape that matches a shape of the inner surface 352 at the first lower corner portion 334, and the second lateral surface 366D of the base flange 366 has a shape that matches a shape of the inner surface 352 at the second lower corner portion 340. This can help to increase a surface area over which the base flange 366 abuts against the composite stringer 320 and, thus, help to transmit loads through the composite stringer assembly 301 as described below.

In the example shown in FIGS. 3A-3B, at the first lower corner portion 334 and the second lower corner portion 340, the outer surface 354 is defined by a first radius of curvature R1 and the inner surface 352 can be defined by a second radius of curvature R2. In FIGS. 3A-3B, the first radius of curvature R1 and the second radius of curvature R2 are substantially constant between the first skin flange 324 and the first web 326, and substantially constant between the second skin flange 332 and the second web 330. Forming the first lower corner portion 334 and/or the second lower corner portion 340 with the constant first radius of curvature R1 and/or the constant second radius of curvature R2 can help to reduce a size of the base flange 366, improve strength of the composite stringer assembly 301, simplify tooling requirements, and/or reduce variability among a plurality of composite stringers 320.

As described above, the first lateral surface 366C and the second lateral surface 366D of the base flange 366 can have a shape that matches the shape of the inner surface at the first lower corner portion 334 and the second lower corner portion 340, respectively. In this example, the first lateral surface 366C and the second lateral surface 366D of the base flange 366 can be defined by the second radius of curvature R2 that defines the inner surface 352 at the first lower corner portion 334 and the second lower corner portion 340. Forming the first lateral surface 366C, the second lateral surface 366D, the inner surface 352 at the first lower corner portion 334, and the inner surface 352 at the second lower corner portion 340 to be defined the second radius of curvature R2 can help to strengthen the coupling between the base flange 366 and the composite stringer 320 and/or simplify tooling requirements for forming the composite stringer assembly 301.

In general, the composite stringer assembly 301, including the composite stringer 320 and the base flange 366, is formed from a plurality of plies of composite material (e.g., the first skin flange 324, the first lower corner portion 334, the first web 326, the first upper corner portion 336, the top flange 328, the second upper corner portion 338, the second web 330, the second lower corner portion 340, the second skin flange 332, and the base flange 366 include the plies of composite material). As one example, the composite material can be carbon fiber reinforced plastic ("CFRP"). Each ply can include a reinforcement material and a matrix material. The matrix material can bind and supports the reinforcement material. As examples, the matrix material can include a non-conductive polymer such as an epoxy resin, and the reinforcement material can include one or more strands carbon fiber.

In an example, the composite stringer 320 can include a first subset of the plies of composite material, and the base flange 366 can include a second subset of the plies of composite material. In this way, the composite stringer 320 and the base flange 366 can be formed from different plies of composite material, and can be coupled to each other in the arrangement described above. In one implementation, the composite stringer 320 and the base flange 366 can be coupled to each other by co-curing the composite stringer 320 and the base flange 366. In some implementations, the composite stringer 320 and the base flange 366 can also be coupled to the support structure 322 by co-curing the composite stringer 320, the base flange 366, and the support structure 322.

As noted above, the sixth gage 368 of the base flange 366 can be greater than the first gage 356 of the first skin flange 324 and the fifth gage 364 of the second skin flange 332 to provide for the bottom surface 366A extending between the first skin flange 324 and the second skin flange 332 while the top surface 366B extends between the first web 326 and the second web 330. In one example, the base flange 366 can include at least ten plies of composite material, whereas the first skin flange 324 and the second skin flange 332 can include less than ten plies of composite material. This can enable base flange 366 to carry an in-plane shear load and an axial compression load as well as provide support to the first web 326 and the second web 330. In another example, the base flange 366 can include between 10 plies and 60 plies of composite material. This can also enable base flange 366 to carry loads and provide support to the first web 326 and the second web flange 330 as mentioned above, while maintaining a relatively low weight and cost.

Within examples, the top surface 366B and the bottom surface 366A of the base flange 366 can be parallel to the skin 323 of the vehicle. As noted above, arranging the bottom surface 366A to be parallel to the skin 323 of the vehicle can help to promote a relatively strong bond between the composite stringer assembly 301 and the support structure 322 at the interface between the base flange 366 and the support structure 322. Additionally, arranging the top surface 366B to be parallel to the skin 323 can help to fabricate the composite stringer assembly 301 with a relatively good quality and at relatively rapid speeds as compared to composite stringer assemblies 301 having the top surface 366B in a different arrangement. However, in other examples, the top surface 366B can have such alternative arrangements.

As noted above, in FIGS. 3A-3B, the first skin flange 324, the first web 326, the top flange 328, the second web 330, and the second skin flange 332 are all formed with a common or substantially equal gage. In some implementations, the top flange 328 tends to bear a greater amount of a load relative to the first skin flange 324, the first web 326, the second web 330, or the second skin flange 332. As such, for the composite stringer 320 formed with a common or substantially equal gage, the gage of the first skin flange 324, the first web 326, the top flange 328, the second web 330, and the second skin flange 332 may be based on a load bearing requirement of the top flange 328. As a result, the first skin flange 324, the first web 326, the second web 330, and/or the second skin flange 332 of the composite stringer 320 generally have a greater gage than is needed to meet the load bearing requirements of the first skin flange 324, the first web 326, the second web 330, and/or the second skin flange 332. This excess gage of the first skin flange 324, the first web 326, the second web 330, and/or the second skin flange 332 can impose a weight penalty and/or increased manufacturing costs.

Additionally, for example, because the first skin flange 324 and the second skin flange 332 have the same gage as the top flange 328, the first skin flange 324 and the second skin flange 332 may have a stiffness that is relatively greater than a stiffness of the support structure 322 in some implementations. As used herein, the term "stiffness" means an extent to which an object (e.g., the skin flange and/or the support structure) resists deformation in response to an applied force. In some instances, a relatively large mismatch between (i) the stiffness of the first skin flange 324 and the second skin flange 332 and (ii) the stiffness of the support structure 322 may lead to delamination of the composite stringer 320 from the support structure 322 under certain mechanical loads. Although the base flange 366 can help to mitigate such delamination as described above, forming the composite stringer 320 with a variable gage as described below can further enhance a capability of the composite stringer assembly 301 resisting delamination.

Also, for example, as different portions of the aircraft may be expected to experience different loads, the gage of the composite stingers may vary from stringer to stringer. For instance, the aircraft can include some composite stringers having relatively larger gages at locations on the aircraft that are expected to experience a relatively greater amount of loading and other composite stringers having relatively smaller gages at locations on the aircraft that are expected to experience a relatively lesser amount of loading. Because different composite stringers at different locations in an aircraft may have different gages, designing and manufacturing the composite stringers can be relatively complex and costly due to, for example, increased weight considerations and/or different tooling requirements to address the individual stringer designs.

Figure 4A:
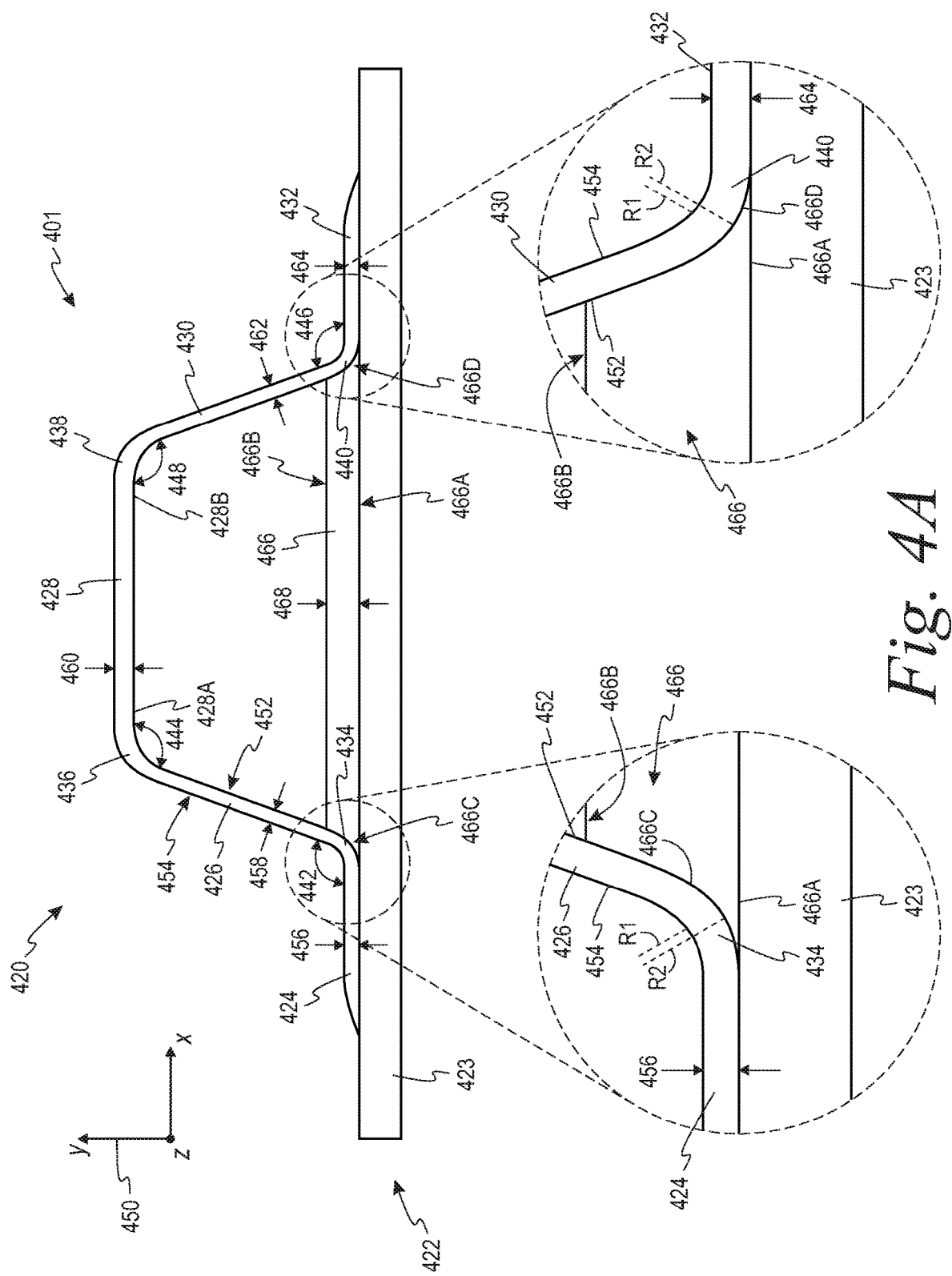
FIG. 4A depicts a side view of a composite structure assembly, according to an example.
Figure 4B:
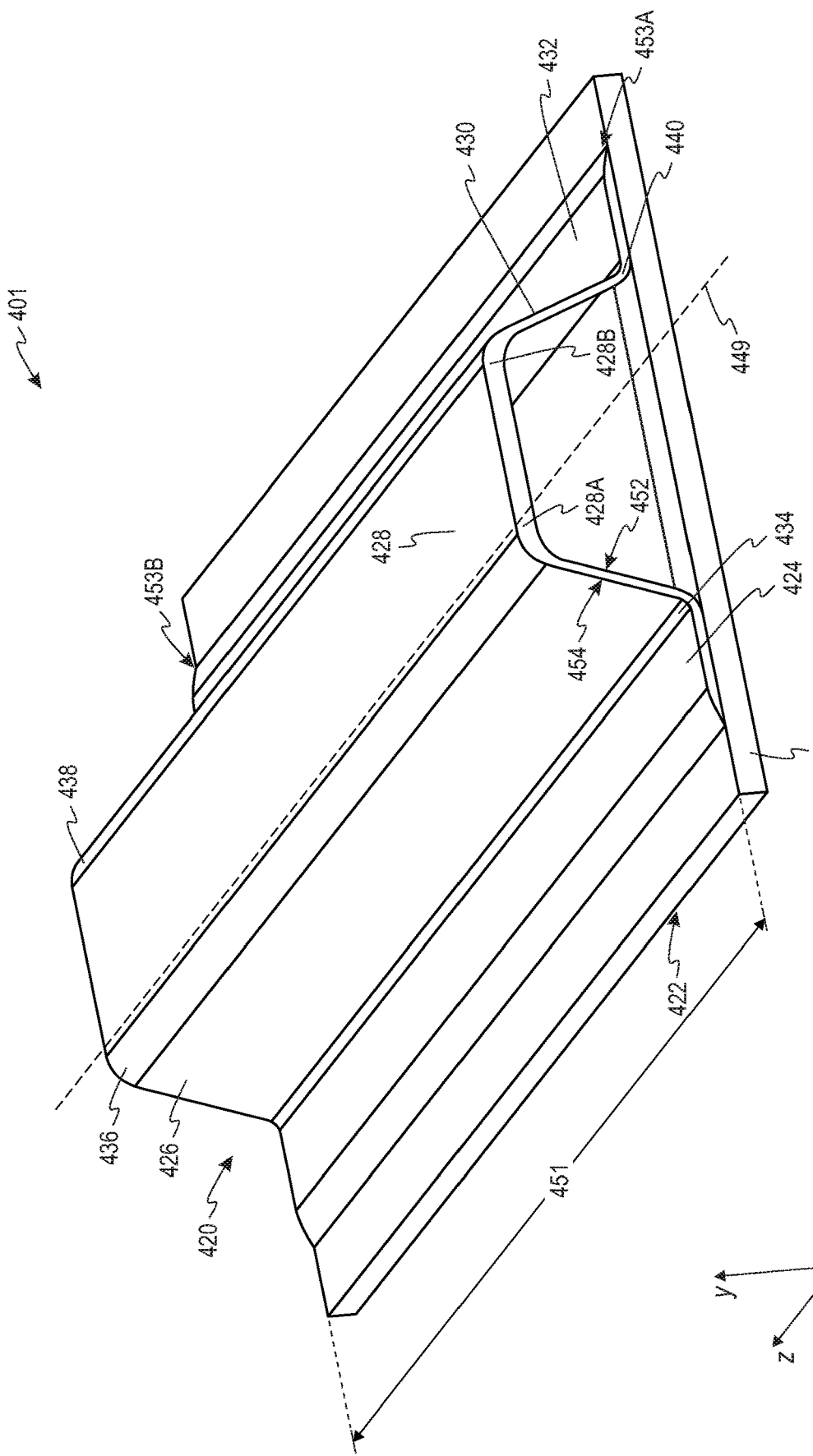
FIG. 4B depicts a perspective view of the composite structure assembly shown in FIG. 3A, according to an example.

Referring now to FIGS. 4A-4B, a composite stringer assembly 401 including a composite stringer 420 coupled to a support structure 422 is illustrated according to another example. In particular, FIG. 4A depicts a side view of the composite stringer 420 and the support structure 422, and FIG. 4B depicts a perspective view of the composite stringer 420 and the support structure 422. The composite stringer 420 shown in FIGS. 4A-4B is substantially similar to the composite stringer 320 shown and described with respect to FIGS. 3A-3B, except the composite stringer 420 is formed with a variable gage in that at least one portion of the composite stringer 420 has a gage that is different than a gage of at least one other portion of the composite stringer 420.

As shown in FIGS. 4A-4B, the composite stringer 420 includes a first skin flange 424, a first web 426, a top flange 428, a second web 430, and a second skin flange 432. The top flange 428 includes a first side 428A and a second side 428B. The first web 426 extends between the first skin flange 424 and the first side 428A of the top flange 428. The first skin flange 424 is configured to be coupled to the support structure 422. The second web 430 extends between the second skin flange 432 and the second side 428B of the top flange 428. The second skin flange 432 is also configured to be coupled to the support structure 422.

As noted above, the first skin flange 424 and the second skin flange 432 are configured to be coupled to the support structure 422. For example, the first skin flange 424 and the second skin flange 432 can extend in a plane that is substantially parallel to a surface of the support structure 422 to which the first skin flange 424 and the second skin flange 432 are coupled. This can help to promote a relatively strong bond between the composite stringer 420 and the support structure 422 at an interface between (i) the first skin flange 424 and the second skin flange 432 and (ii) the support structure 422 due, at least in part, to a relatively large surface area of the interface.

In FIGS. 4A-4B, the support structure 422 is a skin 423 of a vehicle (e.g., the skin panel 210 of the fuselage 110, the wing assemblies 112, and/or the empennage 114). However, as described below, the support structure 422 can additionally or alternatively include a base charge coupled to the skin 423 of the vehicle. The base charge can include a plurality of plies of composite material and can be used, for example, to help support and cushion the composite stringer 420 on the skin 423. Thus, more generally, the support structure 422 can include at least one of the skin 423 of the vehicle or the base charge.

As shown in FIGS. 4A-4B, the composite stringer 420 can further include one or more corner portions, which each provides a transition section between two other portions of the composite stringer 420 (i.e., between two of the first skin flange 424, the first web 426, the top flange 428, the second web 430, and the second skin flange 432). For instance, in FIGS. 4A-4B, the corner portion(s) of the composite stringer 420 can include (i) a first lower corner portion 434 extending from the first skin flange 424 to the first web 426, (ii) a first upper corner portion 436 extending from the first web 426 to the top flange 428, (iii) a second lower corner portion 440 extending from the second skin flange 432 to the second web 430, and/or (iv) a second upper corner portion 438 extending from the second web 430 to the top flange 428.

In general, the first lower corner portion 434 can provide a transition section between the first skin flange 424 and the first web 426, whereas the first upper corner portion 436 can provide a transition section between the first web 426 and the top flange 428. Similarly, the second lower corner portion 440 can provide a transition section between the second skin flange 432 and the second web 430, whereas the second upper corner portion 438 can provide a transition section between the second web 430 and the top flange 428.

For example, in FIGS. 4A-4B, the first skin flange 424, the first web 426, the top flange 428, the second web 430, and the second skin flange 432 can be planar structures that each extend in a respective plane in space. The respective planes in which the first skin flange 424, the first web 426, the top flange 428, the second web 430, and the second skin flange 432 extend can be different from each other. As such, the first lower corner portion 434, the first upper corner portion 436, the second lower corner portion 440, and/or the second upper corner portion 438 can include a curved shape and/or a bent shape that facilitates transitioning from one plane to another.

For instance, FIGS. 4A-4B indicates a coordinate system 450, and FIG. 4A depicts the composite stringer assembly 401 in an X-Y plane of the coordinate system 450. As shown in FIGS. 4A-4B, the first skin flange 424, the top flange 428, and the second skin flange 432 each extend in a respective plane parallel to an X-Z plane of the coordinate system 450, whereas the first web 426 and the second web 430 can each extend in a respective plane that is transverse to the X-Z plane of the coordinate system 450. In this arrangement, the first lower corner portion 434 can define an angle 442 between the first skin flange 424 and the first web 426, the first upper corner portion 436 can define an angle 444 between the first web 426 and the top flange 428, the second lower corner portion 440 can define an angle 446 between the second skin flange 432 and the second web 430, and the second upper corner portion 438 can define an angle 448 between the second skin flange 432 and the second web 430.

In one example, the angle 442 between the first skin flange 424 and the first web 426 can be between approximately 95 degrees and approximately 150 degrees, and the angle 446 between the second skin flange 432 and the second web 430 can be between approximately 95 degrees and approximately 150 degrees. In another example, the angle 442 and/or the angle 446 can be between approximately 50 degrees and approximately 80 degrees. In another example, the angle 442 and/or the angle 446 can be between approximately 60 degrees and approximately 75 degrees. This can help to enhance a stiffness of one or more portions of the composite stringer 420 (e.g., a stiffness of the top flange 428 relative to the first skin flange 424 and the second skin flange 432), reduce a weight of the composite stringer 420, reduce a cost of fabrication the composite stringer assembly 420, and/or reduce a cost of material for the composite stringer 420.

Additionally, in an example, the angle 444 between the first web 426 and the top flange 428 can be between approximately 95 degrees and approximately 150 degrees, and the angle 448 between the second web 430 and the top flange 428 can be between approximately 95 degrees and approximately 150 degrees. In another example, the angle 444 and/or the angle 448 can be between approximately 100 degrees and approximately 135 degrees. This can also help to enhance a stiffness of one or more portions of the composite stringer 420 (e.g., a stiffness of the top flange 428 relative to the first skin flange 424 and the second skin flange 432), reduce a weight of the composite stringer 420, reduce a cost of fabrication of the composite stringer 420, and/or reduce a cost of material for the composite stringer 420.

Additionally, as shown in FIGS. 4A-4B, the composite stringer 420 can include an inner surface 452 extending along the first skin flange 424, the first lower corner portion 434, the first web 426, the first upper corner portion 436, the top flange 428, the second upper corner portion 438, the second web 430, the second lower corner portion 440, and the second skin flange 432. The inner surface 452 faces the support structure 422 when the first skin flange 424 and the second skin flange 432 are coupled to the support structure 422. The composite stringer 420 also includes an outer surface 454 extending along the first skin flange 424, the first lower corner portion 434, the first web 426, the first upper corner portion 436, the top flange 428, the second upper corner portion 438, the second web 430, the second lower corner portion 440, and the second skin flange 432. The outer surface 454 faces away from the support structure 422 when the first skin flange 424 and the second skin flange 432 are coupled to the support structure 422.

In this arrangement, the first skin flange 424 has a first gage 456, the first web 426 has a second gage 458, the top flange 428 has a third gage 460, the second web 430 has a fourth gage 462, and the second skin flange 432 has a fifth gage 464. The first gage 456, the second gage 458, the third gage 460, the fourth gage 462, and the fifth gage 464 are respective thicknesses between the inner surface 452 and the outer surface 454 at the first skin flange 424, the first web 426, the top flange 428, the second web 430, and the second skin flange 432, respectively. As shown in FIGS. 4A-4B, the third gage 460 of the top flange 428 is greater than the first gage 456 of the first skin flange 424, the second gage 458 of the first web 426, the fourth gage 462 of the second web 430, and the fifth gage 464 of the second skin flange 432. As used herein, the term "greater than" is intended to have its common meaning (i.e., that the third gage 460 is greater than the first gage 456 by any amount, the third gage 460 is greater than the second gage 458 by any amount, the third gage 460 is greater than the fourth gage 462 by any amount, and the third gage 460 is greater than the fifth gage 464 by any amount).

In general, the top flange 428 bears a greater amount of a load on the skin 423 relative to the first skin flange 424, the first web 426, the second web 430, and the second skin flange 432. By providing the top flange 428 with the third gage 460, which is greater than the gages of the other portions of the composite stringer 420, the strength-to-weight ratio of the composite stringer 420 can be improved relative to a composite stringer in which the first skin flange 424, the first web 426, the top flange 428, the second web 430, and the second skin flange 432 all have the same gage (e.g., the composite stringer 320 shown in FIGS. 3A-3B). Additionally, as described in further detail below, reducing the first gage 456 of the first skin flange 324, the second gage 458 of the first web 326, the fourth gage 462 of the second web 430, and the fifth gage 464 of the second skin flange 432 can provide a number of additional benefits.

In FIGS. 4A-4B, the first gage 456 of the first skin flange 424 is approximately equal to the second gage 458 of the first web 426, and the fourth gage 462 of the second web 430 is approximately equal to the fifth gage 464 of the second skin flange 432. This can help to simplify stringer fabrication, reduce stringer tooling cost, and/or reduce fabrication time. However, in other examples, the second gage 458 of the first web 426 can be different than the first gage 456 of the first skin flange 424, and/or the fourth gage 462 of the second web 430 can be different than the fifth gage 464 of the second skin flange 432. This can help to reduce the first gage 456 of the first skin flange 424 and the fifth gage 464 of the second skin flange 432 to use material efficiently and provide for a smooth gradual increase in gage to the top flange 428 to enhance bending stiffness.

In one example, the third gage 460 of the top flange 428 can be approximately 1.5 millimeters (mm) to approximately 16.0 mm. In this example, the first gage 456, the second gage 458, the fourth gage 462, and/or the fifth gage 464 can be less than the second gage 458 and within a range of approximately 0.6 mm to approximately 12.0 mm. In another example, the third gage 460 can be approximately 2.0 mm to approximately 14.0 mm. In this example, the first gage 456, the second gage 458, the fourth gage 462, and/or the fifth gage 464 can be less than the second gage 458 and within a range of approximately 0.8 mm to approximately 10.0 mm. In a further example, the third gage 460 can be approximately 2.4 mm to approximately 12.0 mm. In this example, the first gage 456, the second gage 458, the fourth gage 462, and/or the fifth gage 464 can be less than the second gage 458 and within a range of approximately 1.0 mm to approximately 8.0 mm. Other examples are also possible.

In one example, the third gage 460 can be approximately 10 percent to approximately 500 percent greater than the first gage 456, the second gage 458, the fourth gage 462, and/or the fifth gage 464. In another example, the third gage 460 can be approximately 14 percent to approximately 300 percent greater than the first gage 456, the second gage 458, the fourth gage 462, and/or the fifth gage 464. In yet another example, the third gage 460 can be approximately 30 percent to approximately 200 percent greater than the first gage 456, the second gage 458, the fourth gage 462, and/or the fifth gage 464. The foregoing are illustrative examples of the third gage 460 being greater than the first gage 456, the second gage 458, the fourth gage 462, and/or the fifth gage 464. Other examples are also possible.

Within examples, the first gage 456 of the first skin flange 424 and/or the fifth gage 464 of the second skin flange 432 can be based, at least in part, on a stiffness of the skin 423 of the vehicle. For instance, a stiffness of the first skin flange 424 and a stiffness of the second skin flange 432 can be related to the first gage 456 of the first skin flange 424 and the fifth gage 464 of the second skin flange 432, respectively (e.g., a relative large gage may contribute to a relatively high level of stiffness, whereas a relatively small gage may contribute to a relatively low level of stiffness).

In general, a relatively large mismatch between (i) the stiffness of the first skin flange 424 and/or the second skin flange 432 and (ii) the skin 423 of the vehicle may lead to delamination of the composite stringer 320 from the skin 423 under certain mechanical loads. Within examples, the composite stringer assembly 401 of FIGS. 4A-4B can reduce (or may prevent) such delamination due to stiffness mismatches. For instance, in some examples, the first gage 456 of the first skin flange 424 and the fifth gage 464 of the second skin flange 432 can be configured such that a stiffness of the first skin flange 424 and/or a stiffness of the second skin flange 432 is approximately equal to the stiffness of the skin 423 of the vehicle. This can help to enhance (or may maximize) energy absorption due to an impact and/or a load at an interface between (i) the skin 423 of the vehicle and (ii) the first skin flange 424 or the second skin flange 432, and mitigate delamination between the composite stringer 420 and the skin 423.

As described above, the top flange 424 has the third gage 460, which is greater than the first gage 456 of the first skin flange 424 and the fifth gage 464 of the second skin flange 432. As such, the top flange 428 can have a stiffness that is greater than the stiffness of the first skin flange 424 and/or the second skin flange 432. Thus, the composite stringer 420 can advantageously have a greater amount of stiffness at the top flange 428 where such stiffness is beneficial to carry and transfer loads, and a lesser amount of stiffness at the first skin flange 424 and/or the second skin flange 432 where it is beneficial to allow the composite stringer 420 to flex with the skin 423 of the vehicle so as to mitigate delamination.

As shown in FIG. 4B, the composite stringer 420 has a longitudinal axis 449 and, along a longitudinal axis 449, the composite stringer 320 has a length 451 between a first end 453A of the composite stringer 320 and a second end 453B of the composite stringer 320. In FIG. 4B, along the longitudinal axis 449: the first gage 456 of the first skin flange 424, the second gage 458 of the first web 426, the third gage 460 of the top flange 428, the fourth gage 462 of the second web 430, and the fifth gage 464 of the second skin flange 432 are each substantially constant over the length 451 of the composite stringer 420. Within examples, this can help to simplify stringer fabrication, reduce stringer tooling cost, and/or reduce fabrication time. This can additionally or alternatively help to improve the quality of the composite stringer 420 due to, for example, reduced (or minimized) variation of the first gage 456 of the first skin flange 424, the second gage 458 of the first web 426, the fourth gage 462 of the second web 430, and the fifth gage 464 of the second skin flange 432 over the length 451.

The first skin flange 424, the first web 426, the top flange 428, the second web 430, and the second skin flange 432 include a plurality of plies of composite material. In an example, the plurality of plies of composite material include a plurality of fibers, and the plurality of fibers include approximately 30 percent or more of the first skin flange 424, the first web 426, the top flange 428, the second web 430, and the second skin flange 432 along the longitudinal axis. This can, for example, improve a stiffness of the top flange 428 while reducing weight, fabrication costs, and/or material costs.

In one example, the plurality of plies that form the composite stringer 420 can be laid up at traditional ply angles relative to the longitudinal axis 449. As such, the plurality of plies of the composite material can each have a ply angle, relative to the longitudinal axis 449 of the composite stringer 420, which is equal to any one of the group of ply angles consisting of: 0 degrees, +45 degrees, −45 degrees, and 90 degrees. In another example, the plurality of plies can be laid up at nontraditional ply angles relative to the longitudinal axis 449. For instance, at least one ply of the plurality of plies of composite material can have a ply angle, relative to the longitudinal axis 449 of the composite stringer 420, which is not equal to any one of a group of ply angles consisting of: 0 degrees, +45 degrees, −45 degrees, and 90 degrees. This can, for example, help provide the composite stringer 320 with sufficient flexibility to fit into a contoured panel surface and/or improve fabrication quality.

As shown in FIGS. 4A-4B, the composite stringer assembly 401 also includes a base flange 466. The base flange 466 includes a bottom surface 466A extending between the first skin flange 424 and the second skin flange 432, and a top surface 466B extending between the first web 426 and the second web 430. The bottom surface 466A of the base flange 466 is configured to be coupled to the support structure 422. In this arrangement, the bottom surface 466A of the base flange 466 can provide a continuous structural connection over an entirety of the gap between the first skin flange 424 and the second skin flange 432, and the top surface 466B of the base flange 466 can provide a continuous structural connection over an entirety of the gap between the first web 426 and the second web 430. As a result, the base flange 466 reinforces the first skin flange 424, the second skin flange 432, the first web 426, and the second web 430 to inhibit the composite stringer 420 delaminating from the support structure 422.

Additionally, in this arrangement, the base flange 466, the first skin flange 424, the second skin flange 432, the first web 426, and the second web 430 collectively work together to transmit greater in-plane shear loads and/or greater axial compression loads through the composite stringer assembly 401 compared to conventional composite stringer assemblies that use radius fillers at the first lower corner portion 434 and the second lower corner portion 440. As such, the base flange 466 is configured to transfer an in-plane shear load from the first skin flange 424 to the second skin flange 432 as shown and described in further detail below with respect to FIGS. 9A-9B, and the base flange 466 is configured to transfer an axial compression load as shown and described in further detail below with respect to FIGS. 10A-10D.

As shown in FIGS. 4A-4B, the base flange 466 can have a sixth gage 468. The sixth gage 468 is a thickness between the top surface 466B and the bottom surface 466A of the base flange 466. The sixth gage 468 of the base flange 466 is greater than the first gage 456 of the first skin flange 424 and the fifth gage 464 of the second skin flange 432. This provides for arranging (i) the bottom surface 466A of the base flange 466 extending between the first skin flange 424 and the second skin flange 432 (ii) while the top surface 466B of the base flange 466 extends between the first web 426 and the second web 430 as described above.

In one example, the base flange 466 can include at least ten plies of composite material, whereas the first skin flange 424 and the second skin flange 432 can include less than ten plies of composite material. In another example, the base flange 466 can include between 10 plies and 60 plies of composite material. The stiffness of the base flange 466 can be based, at least in part, on the quantity of plies of composite material that form the base flange 466. In some examples, forming the base flange 466 from between 10 plies and 60 plies of the composite material can provide the base flange 466 with a stiffness that is sufficiently similar to a stiffness of the skin 423 of the vehicle (e.g., an aircraft panel) while reinforcing the first skin flange 424, the second skin flange 432, the first web 426, and the second web 430 to inhibit the composite stringer 420 delaminating from the support structure 422.

In an example, the first skin flange 424, the base flange 466, and the second skin flange 432 each have a respective stiffness that is approximately equal to a stiffness of the skin 423 of the vehicle. This can help to enhance (or may maximize) energy absorption due to an impact and/or a load at an interface between (i) the skin 423 of the vehicle and (ii) the first skin flange 424, the base flange 466, and/or the second skin flange 432, and mitigate delamination between the composite stringer assembly 401 and the skin 423. In another example, the first skin flange 424, the base flange 466, and the second skin flange 432 can each have a respective stiffness that is up to approximately 30 percent greater than the stiffness of the skin 423 of the vehicle. This can help to reduce stress increase by limiting stiffness mismatch to inhibit delamination between the skin 423 and base flange 466, the first skin flange 424, or the second skin flange 432. This allows gradual stiffness change to top flange 428 to enhance bending stiffness without a big stiffness change which otherwise can cause delamination between the skin 423 and the composite stringer 420.

In FIGS. 4A-4B, the third gage 460 of the top flange 428 is also greater than the sixth gage 468 of the base flange 466. This can efficiently provide bending stiffness to inhibit buckling due to an axial compression load. However, in other examples, the third gage 460 of the top flange 428 can be approximately equal to or slightly less than the sixth gage 468 of the base flange 466. This may be beneficial in implementations in which is desired to provide relatively greater protection against delamination due to in-plane shear load and out-of-plane pull off load.

As noted above, the bottom surface 466A of the base flange 466 is configured to couple to the support structure 422. For example, the bottom surface 466A of the base flange 466 can extend in a plane that is substantially parallel to the surface of the support structure 422 to which the bottom surface 466A of the base flange 466 is coupled. This can help to further promote a relatively strong bond between the composite stringer assembly 401 and the support structure 422 at an interface between the base flange 466 and the support structure 422 due, at least in Additionally, as shown in FIGS. 4A-4B, the base flange 466 can include a first lateral surface 466C extending between the top surface 466B and the bottom surface 466A of the base flange 466, and a second lateral surface 466D extending between the top surface 466B and the bottom surface 466A of the base flange 466. The first lateral surface 466C is coupled to the first lower corner portion 434 of the composite stringer 420, and the second lateral surface 466D is coupled to the second lower corner portion 440 of the composite stringer 420. This can help to increase the support provided by the base flange 466 to the composite stringer 420. For instance, coupling the base flange 466 to the composite stringer 420 in this manner can assist in transmitting greater in-plane shear loads and/or greater axial compression loads through the composite stringer assembly 401 compared to conventional composite stringer assemblies that use radius fillers at the first lower corner portion 434 and the second lower corner portion 440.

As described above, the first lower corner portion 434 can include a curved shape and/or a bent shape that facilitates transitioning from the first skin flange 424 to the first web 426, and the second lower corner portion 440 can include a curved shape and/or a bent shape that facilitates transitioning from the second skin flange 432 to the second web 430.

In FIGS. 4A-4B, the first lateral surface 466C of the base flange 466 has a shape that matches a shape of the inner surface 452 at the first lower corner portion 434, and the second lateral surface 466D of the base flange 466 has a shape that matches a shape of the inner surface 452 at the second lower corner portion 440. This can help to increase a surface area over which the base flange 466 abuts against the composite stringer 420 and, thus, help to transmit loads through the composite stringer assembly 401 as described below.

As described above, the first lateral surface 466C and the second lateral surface 466D of the base flange 466 can have a shape that matches the shape of the inner surface at the first lower corner portion 434 and the second lower corner portion 440, respectively. In this example, the first lateral surface 466C and the second lateral surface 466D of the base flange 466 can be defined by the second radius of curvature R2 that defines the inner surface 452 at the first lower corner portion 434 and the second lower corner portion 440. Forming the first lateral surface 466C, the second lateral surface 466D, the inner surface 452 at the first lower corner portion 434, and the inner surface 452 at the second lower corner portion 440 to be defined the second radius of curvature R2 can help to strengthen the coupling between the base flange 466 and the composite stringer 420 and/or simplify tooling requirements for forming the composite stringer assembly 401.

As shown in FIG. 4A, the second radius of curvature R2 can be approximately equal to a sum of the first radius of curvature R1 and the first gage 456 of the first skin flange 424. In one example, the first radius of curvature R1 can be between approximately 3.0 mm and approximately 130.0 mm, the first gage 356 can be between approximately 0.6 mm and approximately 12.0 mm, and thus the second radius of curvature R2 can be between approximately 3.6 mm and approximately 142.0 mm. In another example, the first radius of curvature R1 can be between approximately 4.0 mm and approximately 100.0 mm, the first gage 838 can be between approximately 1.0 mm and approximately 8.0 mm, and thus the second radius of curvature R2 can be between approximately 5.0 mm and approximately 108.0 mm. Within examples, reducing the first radius of curvature R1 can help to reduce a cost of tooling and/or a cost of fabrication for the composite stringer 820.

As shown in FIG. 4B, along the longitudinal axis 848, the first radius of curvature R1 and/or the second radius of curvature R2 can be substantially constant over the length 849 of the composite stringer 820. This can also help to reduce a size of the base flange 466, improve strength of the composite stringer assembly 401, simplify tooling requirements, and/or reduce variability among a plurality of composite stringers 420.

As described above, a variability among a plurality of composite stringers 420 can be reduced by (i) forming the outer surface 454 at the first lower corner portion 434 and/or the second lower corner portion 440 with the first radius of curvature R1 that is substantially constant and/or (ii) forming the inner surface 452 at the first lower corner portion 434 and/or the second lower corner portion 440 with the second radius of curvature R2 that is substantially constant. Further, reducing the variability of these features among the plurality of composite stringers 420 can help to reduce manufacturing costs and/or simplify tooling requirements forming a composite stringer assembly 401 including a plurality of composite stringers 420.

For example, a single type of base flange 466 having one size and/or one shape can be used with a plurality of different types of composite stringers 420 when the outer surfaces 454 and/or the inner surfaces 452 at the first lower corner portion 434 and the second lower corner portion 440 of the composite stringers 420 have a common, constant first radius of curvature R1 and/or a common, constant second radius of curvature R2, respectively. For instance, a plurality of composite stringers 420 having different third gages 460 at the top flanges 428 can be coupled with a common type of base flange 466 when the outer surface 454 and/or the inner surface 452 have a common, constant first radius of curvature R1 and/or a common, constant second radius of curvature R2, respectively.

Within examples, the top surface 466B and the bottom surface 466A of the base flange 466 can be parallel to the skin 423 of the vehicle. As noted above, arranging the bottom surface 466A to be parallel to the skin 423 of the vehicle can help to promote a relatively strong bond between the composite stringer assembly 401 and the support structure 422 at the interface between the base flange 466 and the support structure 422. Additionally, arranging the top surface 466B to be parallel to the skin 423 can help to fabricate the composite stringer assembly 401 with a relatively good quality and at relatively rapid speeds as compared to composite stringer assemblies 301 having the top surface 466B in a different arrangement. However, in other examples, the top surface 466B can have such alternative arrangements.

In the example shown in FIGS. 4A-4B, the first skin flange 424, the first web 426, the top flange 428, the second web 430, and the second skin flange 432 are planar structures. However, in other examples, the first skin flange 424, the first web 426, the top flange 428, the second web 430, and/or the second skin flange 432 can be nonplanar structures. For instance, the first skin flange 424 and/or the second skin flange 432 can be a nonplanar structure so as to conform to a nonplanar shape of the support structure 422.

Additionally or alternatively, the first lower corner portion 434, the first upper corner portion 436, the second lower corner portion 440, and/or the second upper corner portion 438 can be configured to transition from one gage to another gage. For instance, in FIGS. 4A-4B, the first upper corner portion 436 provides for transitioning from the second gage 458 of the top flange 428 to the third gage 460 of the first web 426, where the second gage 458 is greater than the third gage 460. As such, the first upper corner portion 436 can have a variable gage that decreases in a direction from the top flange 428 toward the first web 426. Similarly, in FIGS. 4A-4B, the second upper corner portion 438 provides for transitioning from the second gage 458 of the top flange 428 to the fifth gage 464 of the second web 430. As such, the second upper corner portion 438 can have a variable gage that decreases from the top flange 428 toward the second web 430.

In FIGS. 4A-4B, the first gage 456 of the first skin flange 424 is approximately equal to the third gage 460 of the first web 426, and the fourth gage 462 of the second skin flange 432 is approximately equal to the fifth gage 464 of the second web 430. As such, in FIGS. 4A-4B, the first lower corner portion 434 can have a gage that is approximately equal to the first gage 456 and the third gage 460, and the second lower corner portion 440 can have a gage that is approximately equal to the fourth gage 462 and the fifth gage 464. However, in other examples in which the first skin flange 424, the first web 426, the second skin flange 432, and/or the second web 430 have different gages relative to each other, the first lower corner portion 434 and/or the second lower corner portion 440 can have a variable gage that increases or decreases between the first skin flange 424, the first web 426, the second skin flange 432, and/or the second web 430.

Within examples, to transition from one gage to another gage, the first lower corner portion 434, the first upper corner portion 436, the second lower corner portion 440, and/or the second upper corner portion 438 can include a plurality of continuous plies and one or more drop-off plies. In general, each continuous ply extends from a first end to a second end of the first lower corner portion 434, the first upper corner portion 436, the second lower corner portion 440, and/or the second upper corner portion 438. By contrast, each drop-off ply extends from the first end to a respective position of a tip of the drop-off ply between the first end and the second end. In this arrangement, there are fewer plies at the second end relative to the first end. Thus, by positioning the tips of the drop-off plies between the first end and the second end, the gage decreases from the first end to the second end so as to transition from one gage to another gage.

For example, in FIGS. 4A-4B, the plurality of plies of composite material can include a plurality of continuous plies and a plurality of drop-off plies. As noted above, in FIGS. 4A-4B, the first upper corner portion 436 can facilitate transitioning from the second gage 458 of the top flange 428 to the third gage 460 of the first web 426. In this example, the first skin flange 424, the first web 426, the first upper corner portion 436, and the top flange 428 can include each continuous ply. Additionally, in this example, the top flange 428 and the first upper corner portion 436 can include each drop-off ply, whereas the first skin flange 424 and the first web 426 can omit the drop-off plies. In particular, for instance, each drop-off ply can have a free end (i.e., a tip) at the first upper corner portion 436 such that the drop-off ply does not extend to the first web 426 and the first skin flange 424. As described in further detail below, the free end of each drop-off ply can have a blunt-end shape and/or a tapered shape.

Figure 5:
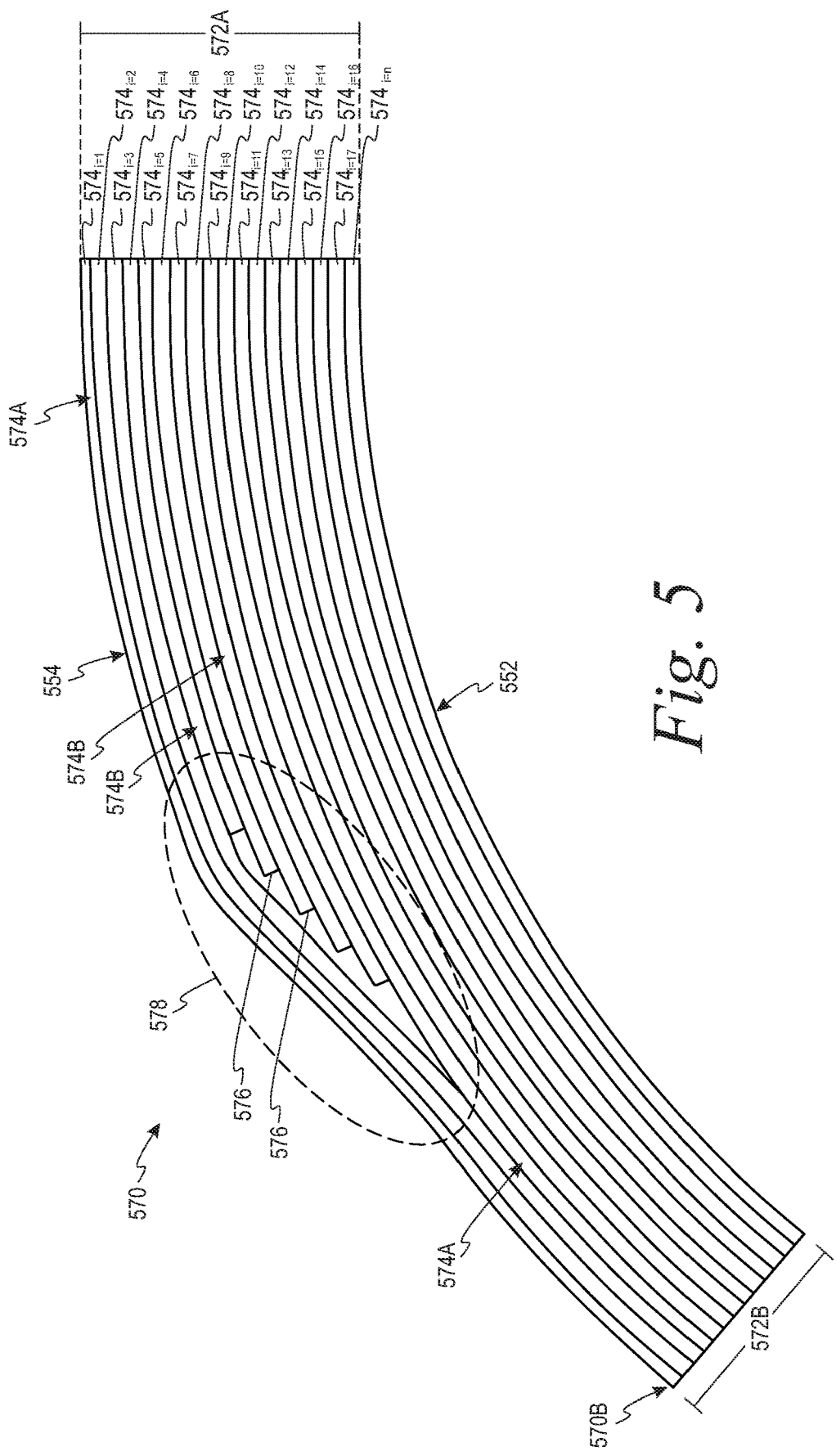
FIG. 5 depicts a composite structure, according to an example.
Figure 6:
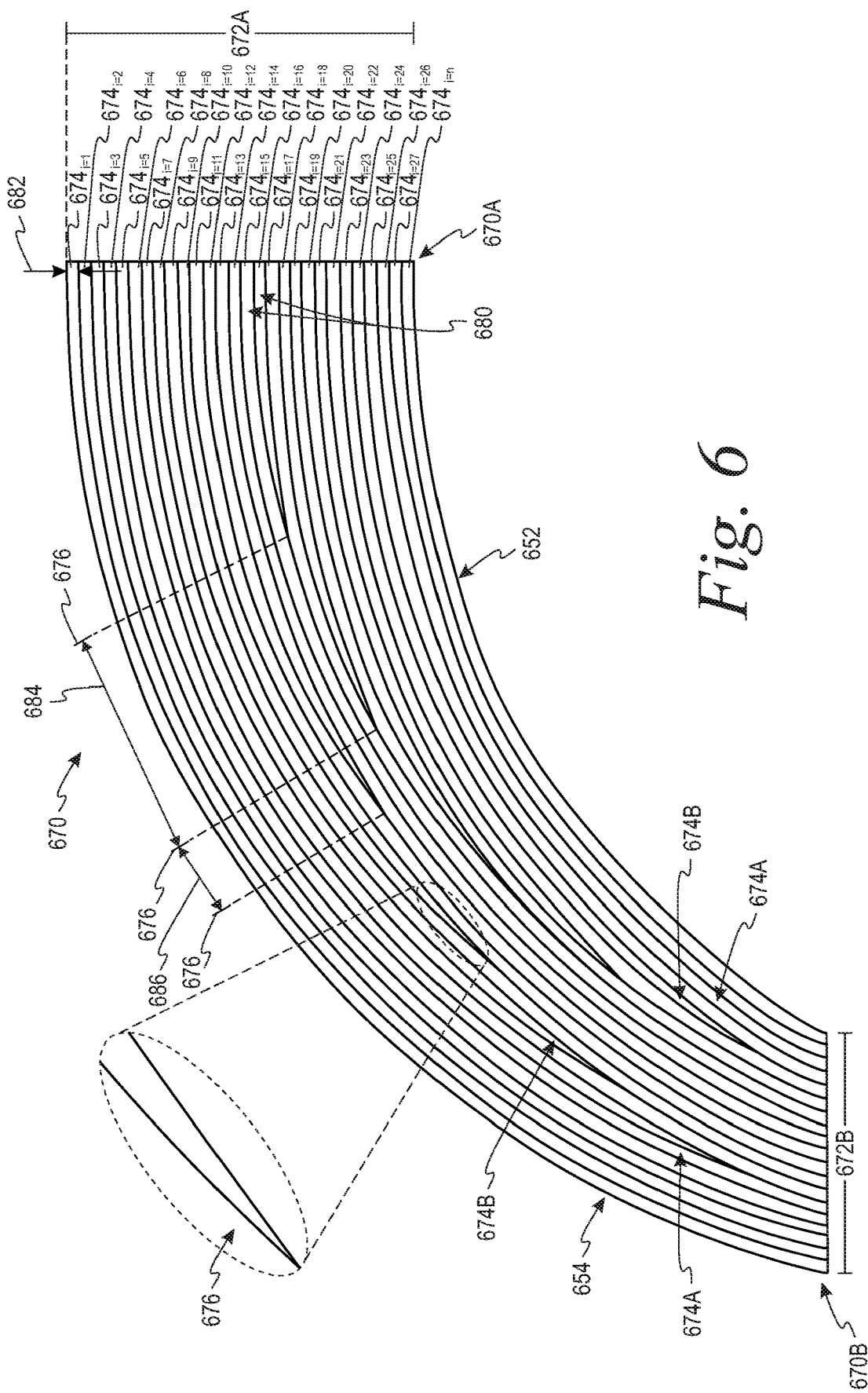
FIG. 6 depicts a composite structure, according to another example.
Figure 7:
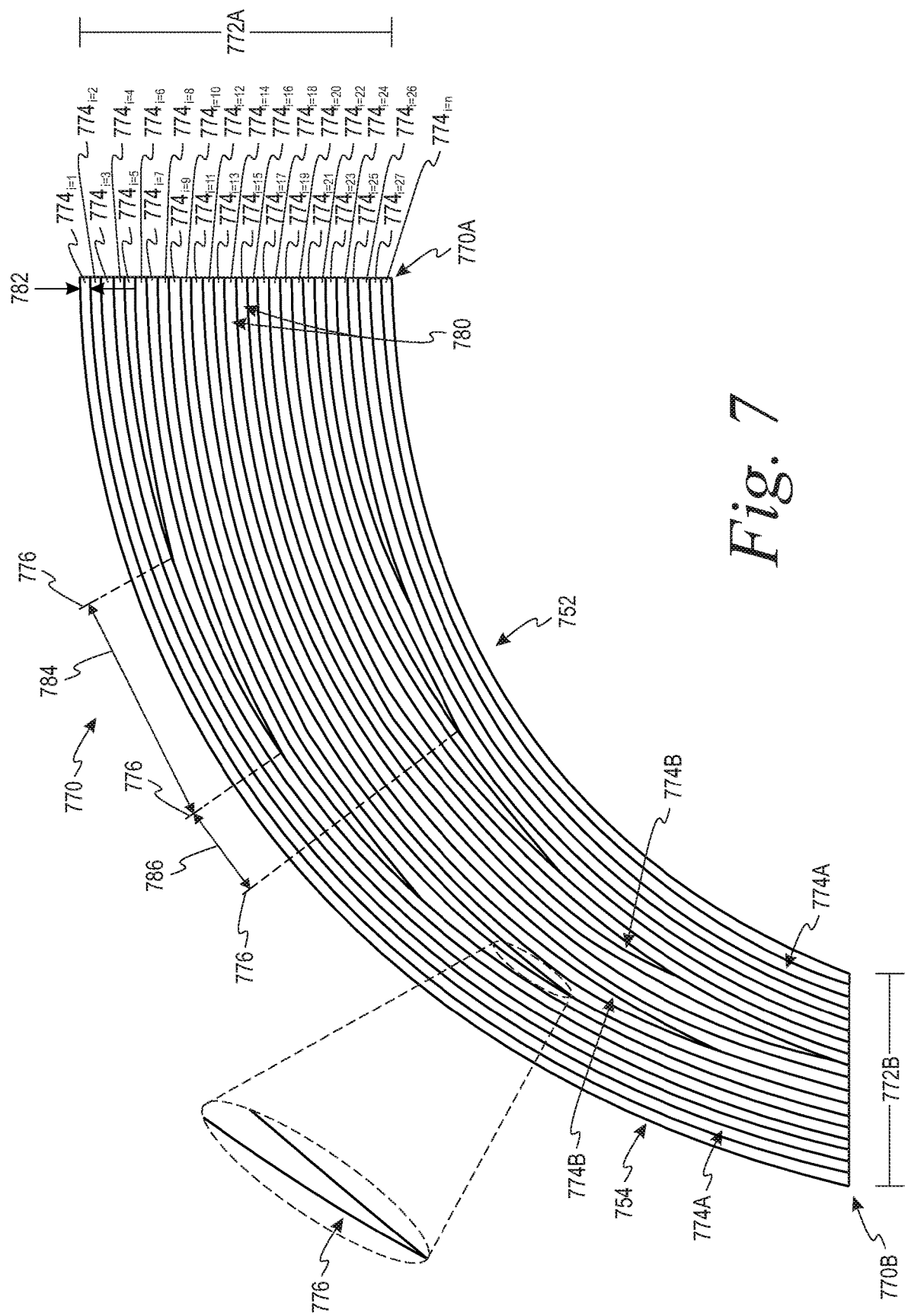
FIG. 7 depicts a composite structure, according to another example.

As examples, FIGS. 5-7 each depict a respective composite structure having a variable gage for transitioning from one gage to another gage. The composite structures shown in FIGS. 5-7 can be a corner portion of the composite stringer 420 such as, for example, the first lower corner portion 434, the first upper corner portion 436, the second lower corner portion 440, and/or the second upper corner portion 438 shown in FIGS. 4A-4B.

FIG. 4 depicts a composite structure 570 according to an example. As shown in FIG. 4, the composite structure 570 includes a first end 570A having a first gage 572A and a second end 570B having a second gage 572B, which is less than the first gage 572A of the first end 570A. The composite structure 570 also includes an inner surface 452 extending from the first end 570A to the second end 570B, and an outer surface 454 extending from the first end 570A to the second end 570B.

In one implementation, the first end 570A and the second end 570B can be respective interfaces between the composite structure 570 and other portions of a composite stringer (e.g., the composite stringer 420). For instance, in an example in which the composite structure 570 is the first upper corner portion 436 in FIGS. 4A-4B, the first end 570A can be a first interface between the first upper corner portion 436 and the top flange 428, and the second end 570B can be a second interface between the first upper corner portion 436 and the first web 426 in FIGS. 4A-4B. Also, in this example, the first gage 572A of the first end 570A of the composite structure 570 can be approximately equal to the second gage 458 of the top flange 428, and the second gage 572B of the second end 570B of the composite structure 570 can be approximately equal to the third gage 460 of the first web 426.

In other examples (e.g., in which the composite structure 570 is the first lower corner portion 434, the second lower corner portion 440, or the second upper corner portion 438), the first gage 572A of the first end 570A and the second gage 572B of the second end 570B can correspond to respective ones of the first gage 456, the second gage 458, the third gage 460, the fourth gage 462, and/or the fifth gage 464 to facilitate transitioning between corresponding ones of the first skin flange 424, the first web 426, the top flange 428, the second web 430, and the/or the second skin flange 432.

As also shown in FIG. 4, the composite structure 570 includes a plurality of plies $574_{i=1}$ to $574_{i=n}$ of composite material (hereinafter collectively referred to as "plies $574_i$") arranged in a stack between the inner surface 452 and the outer surface 454, where n is an integer value that is greater than or equal to two. In FIG. 4, the composite structure 570 includes a total of 18 plies $574_i$ (i.e., n=18). However, in other examples, the composite structure 570 can include a lesser quantity or a greater quantity of plies $574_i$.

In this arrangement, the first gage 572A of the first end 570A and the second gage 572B of the second end 570B are respective thicknesses between the inner surface 452 and the outer surface 454 at the first end 570A and the second end 570B, respectively. Further, the first gage 572A is related to a quantity of the plies $574_i$ at the first end 570A and the second gage 572B is related to a quantity of the plies $574_i$ at the second end 570B. For instance, in FIG. 4, the quantity of the plies $574_i$ at the first end 570A is greater than the quantity of the plies $574_i$ at the second end 570B such that the first gage 572A is greater than the second gage 572B.

Specifically, to vary the quantity of the plies $574_i$ between the first end 570A and the second end 570B, the plies $574_i$ of composite material include a plurality of continuous plies 574A and a plurality of drop-off plies 574B. In FIG. 4, each continuous ply 574A extends from the first end 570A to the second end 570B. Whereas, each drop-off ply 574B includes a tip 576, and each drop-off ply 574B extends from the first end 570A to a respective position of the tip 576 of the drop-off ply 574B between the first end 570A and the second end 570B.

Accordingly, while the continuous plies 574A are present at the first end 570A and the second end 570B, the drop-off plies 574B are present at the first end 570A and absent at the second end 570B. In this way, the drop-off plies 574B can contribute to the first gage 572A at the first end 570A, whereas the drop-off plies 574B do not contribute to the second gage 572B at the second end 570B due to the drop-off plies 574B terminating prior to the second end 570B (i.e., the tips 576 being located at the respective positions between the first end 570A and the second end 570B).

For clarity of illustration, in FIG. 4, a representative subset of the continuous plies 574A are labeled with reference number 574A and a representative subset of the drop-off plies 574B are labeled with reference number 574B. However, each of the plies $574_i$ that extends entirely from the first end 570A to the second end 570B is one of the continuous plies 574A, and each of the plies $574_i$ that terminates between the first end 570A and the second end 570B is one of the drop-off plies 574B. Specifically, in FIG. 4, the plies $574_{i=1\text{-}3,\ 9\text{-}18}$ are the continuous plies 574A, and the plies $574_{i=4\text{-}8}$ are the drop-off plies 574B.

As shown in FIG. 4, the tip 576 of each drop-off ply 574B has a blunt-end shape, and the drop-off plies 574B are arranged immediately next to each other in the stack (e.g., in a cluster). In general, this approach to transitioning from one gage to another gage can be effective. However, it has been found that the performance of the composite structure 570 (and/or a composite stringer 420 incorporating the composite structure 570) can be improved using one or more of the techniques described in detail below with respect to FIGS. 5-6.

For example, using drop-off plies 574B with blunt-end shaped tips 576 and/or arranging the drop-off plies 574B in a cluster can result in a relatively large resin pocket in a region 578 at or near the tips 576 of the drop-off plies 574B. In some instances, the relatively large resin pocket in the region 578 could lead to delamination in the region 578 under certain thermal and/or mechanical loads. Additionally, for example, arranging the tips 576 of the drop-off plies 574B in a cluster may increase a risk of ply kinks and/or wrinkles, which may reduce laminate strength. Further, in some instances, arranging the tips 576 of the drop-off plies at an off-center location (e.g., closer to the outer surface 454 than the inner surface 452) can also increase a risk of ply kinks and/or wrinkles, which can have a reduced static strength and/or a reduced fatigue strength due to potential distortion under thermal and/or mechanical loads.

Within examples, composite structures having variable gages are described, which can improve upon the composite structure 570 in one or more respects. For instance, in some examples, the tips 576 of the drop-off plies 574B can have a tapered shape and/or the plies $574_i$ can be arranged according to one or more patterns that enhance the load carrying capabilities of the composite structure 570.

Referring now to FIG. 5, a composite structure 670 having a variable gage is depicted according to another example. As shown in FIG. 5, the composite structure 670 includes a first end 670A having a first gage 672A and a second end 670B having a second gage 672B, which is less than the first gage 672A of the first end 670A. Additionally, as shown in FIG. 5, the composite structure 670 includes an inner surface 552 extending from the first end 670A to the second end 670B, and an outer surface 554 extending from the first end 670A to the second end 670B.

As also shown in FIG. 5, the composite structure 670 includes a plurality of plies $674_{i=1}$ to $674_{i=n}$ of composite material (hereinafter collectively referred to as "plies $674_i$") arranged in a stack between the inner surface 552 and the outer surface 554, where n is an integer value that is greater than or equal to two. In FIG. 5, the composite structure 670 includes a total of 28 plies $674_i$ (i.e., n=28). However, in other examples, the composite structure 670 can include a lesser quantity or a greater quantity of plies $674_i$.

In this arrangement, the first gage 672A of the first end 670A and the second gage 672B of the second end 670B are respective thicknesses between the inner surface 552 and the outer surface 554 at the first end 670A and the second end 670B, respectively. Further, as described above, the first gage 672A is related to a quantity of the plies $674_i$ at the first end 670A and the second gage 672B is related to a quantity of the plies $674_i$ at the second end 670B. For instance, in FIG. 5, the quantity of the plies $674_i$ at the first end 670A is greater than the quantity of the plies $674_i$ at the second end 670B such that the first gage 672A is greater than the second gage 672B.

As described above, the variable gage of the composite structure 670 results from the plies $674_i$ of composite material including a plurality of continuous plies 674A and a plurality of drop-off plies 674B arranged in the stack between the inner surface 552 and the outer surface 554. In FIG. 5, each continuous ply 674A extends from the first end 670A to the second end 670B. Whereas, each drop-off ply 674B extends from the first end 670A to a respective position of a tip 676 of the drop-off ply 674B between the first end 670A and the second end 670B. Thus, the first gage 672A is based on a quantity of the continuous plies 674A and a quantity of the drop-off plies 674B, and the second gage 672B is based on the quantity of the continuous plies 674A (and not the quantity of the drop-off plies 674B).

For clarity of illustration, in FIG. 5, a representative subset of the continuous plies 674A are labeled with reference number 674A and a representative subset of the drop-off plies 674B are labeled with reference number 674B. However, each of the plies $674_i$ that extends entirely from the first end 670A to the second end 670B is one of the continuous plies 674A, and each of the plies $674_i$ that terminates between the first end 670A and the second end 670B is one of the drop-off plies 674B. Specifically, in FIG. 5, the plies $674_{i=1-6, 8, 10, 12, 14, 15, 17, 19, 21, 23, 25-28}$ are the continuous plies 674A, and the plies $674_{i=7, 9, 11, 13, 16, 18, 20, 22, 24}$ are the drop-off plies 674B.

As shown in FIG. 5, the tip 676 of each drop-off ply 674B has a tapered shape. More particularly, for example, the tip 676 of each drop-off ply 674B can gradually reduce in thickness in a direction along the tip 676 from the first end 670A toward the second end 670B. Because the tip 676 has the tapered shape, the tip 676 can more closely abut against adjacent ones of the plies $674_i$ (e.g., as compared to the blunt-end shaped tips 576 in FIG. 4, which terminate relatively abruptly). As such, the tips 676 having the tapered shape can reduce (or may minimize) resin pockets at the tips 676 of the drop-off plies 674B, which can help to improve (or may maximize) interlaminar strength of the composite structure 670. Accordingly, the tapered shape of the tips 676 of the drop-off plies 674B can help to improve a load bearing performance of the composite structure 670 having the variable gage for transitioning from a section having the first gage 672A to a section having the second gage 672B.

Within examples, the tapered shape of the tips 676 of the drop-off plies 674B can be formed by cutting each drop-off ply 674B at an angle less than approximately 85 degrees relative to a longitudinal axis of the drop-off ply 674B. By contrast, the blunt-end shape of the tips 576 of the drop-off plies 574B shown in FIG. 4 can be formed, for example, by cutting each drop-off ply 574B at an angle of approximately 90 degrees relative to a longitudinal axis of the drop-off ply 574B.

As noted above, the load bearing performance of the composite structure 670 can be enhanced, additionally or alternatively, based on a pattern in which the plies $674_i$ are arranged in the composite structure 670. For example, in FIG. 5, the drop-off plies 674B are separated from each other by at least one of the continuous plies 674A. More particularly, in FIG. 5, each drop-off ply 674B is sandwiched between and abuts against a respective two continuous plies 674A of the plurality of continuous plies 674A. By separating the drop-off plies 674B from each other and/or sandwiching the drop-off plies 674B between the continuous plies 674A, the drop-off plies 674B can be more uniformly distributed between the inner surface 552 and the outer surface 554 (as compared to the clustered arrangement of the drop-off plies 574B shown in FIG. 4). This can help to reduce (or may prevent) ply kinks and/or wrinkles, reduce (or may prevent) resin pockets, and/or increase (or may maximize) interlaminar strength of the composite structure 670.

As noted above, in FIG. 5, the plies $674_{i=1-6, 8, 10, 12, 14, 15, 17, 19, 21, 23, 25-28}$ are the continuous plies 674A, and the plies $674_{i=7, 9, 11, 13, 16, 18, 20, 22, 24}$ are the drop-off plies 674B. Accordingly, in FIG. 5, each of the plies $674_{i=7, 9, 11, 13, 16, 18, 20, 22, 24}$ is separated from each other by at least one of the plies $674_{i=1-6, 8, 10, 12, 14, 15, 17, 19, 21, 23, 25-28}$, and each of the plies $74_{i=7, 9, 11, 13, 16, 18, 20, 22, 24}$ is sandwiched between and abuts against a respective two of the plies $674_{i=1-6, 8, 10, 12, 14, 15, 17, 19, 21, 23, 25-28}$. For instance, in FIG. 5, the ply $674_{i=7}$ is separated from the ply $674_{i=9}$ by the ply $674_{i=8}$, and the ply $674_{i=7}$ is sandwiched between the ply $674_{i=6}$ and the ply $674_{i=8}$. Additionally, for instance, the ply $674_{i=9}$ is separated from the ply $674_{i=11}$ by the ply $674_{i=10}$, separated from the ply $674_{i=9}$ by the ply $674_{i=8}$, and sandwiched between the ply $674_{i=8}$ and the ply $674_{i=10}$. Further, for instance, the ply $674_{i=16}$ is separated from the ply $674_{i=13}$ by the plies $674_{i=14,15}$, separated from the ply $674_{i=18}$ by the ply $674_{i=17}$, and sandwiched between the ply $674_{i=15}$ and the ply $674_{i=17}$. Similar relationships exist for a remainder of the drop-off plies 674B in FIG. 5 (i.e., the plies $674_{i=11, 13, 18, 20, 22, 24}$). As noted above, arranging the plies $674_i$ in a pattern having a characteristic of the drop-off plies 674B interleaved with the continuous plies 674A (e.g., as shown in FIG. 5) can help to reduce (or may prevent) ply kinks and/or wrinkles, reduce (or may prevent) resin pockets, and/or increase (or may maximize) interlaminar strength of the composite structure 670.

Within examples, the pattern of the tips 676 of the drop-off plies 674B can additionally or alternatively include one or more of the following characteristics: (i) an arrangement of the tips 676 in a first half of the composite structure 670 in a pattern that mirrors a pattern of the tips 676 in a second half of the composite structure 670, (ii) a staggered arrangement of the tips 676 relative to each other, and/or (iii) spacing the tips 676 relative to each other by at least one threshold distance (e.g., at least one distance related to respective positions and/or respective thicknesses of one or more of the plies $674_i$). Each of these characteristics alone or in combination can contribute to arranging the drop-off plies 674B in a pattern that can reduce (or may prevent) ply kinks and/or wrinkles, reduce (or may prevent) resin pockets, and/or increase (or may maximize) interlaminar strength.

FIG. 5 shows the tips 676 arranged in mirror patterns relative to a central portion 680 of the composite structure 670 according to one example. The central portion 680 can include one or more of the plies $674_i$ that provide a frame of reference for characterizing patterns of the tips 676 of the drop-off plies 674B on opposing sides of the central portion 680. In general, the central portion 680 (i) is between the inner surface 552 and the outer surface 554 and (ii) extends from the first end 670A to the second end 670B.

In FIG. 5, the central portion 680 can include the plies $674_{i=15,16}$. Thus, in FIG. 5, the central portion 680 can include a single drop-off ply 674B (i.e., the ply $674_{i=16}$) and a single continuous ply 674A (i.e., the ply $674_{i=15}$). However, in another example, the central portion 680 can include two drop-off plies 674B and at least one continuous ply 674A. In yet another example, the central portion 680 can consist of only a single drop-off ply 674B. In another example, the central portion 680 can consist of one or more continuous plies 674A and omit the drop-off plies 674B. More generally, the central portion 680 can include one or more of the continuous plies 674A and/or one or more of the drop-off plies 674B.

As noted above, the tips 676 of the drop-off plies 674B can be arranged in substantially mirror or mirror patterns relative to the central portion 680. For instance, a first subset of the drop-off plies 674B can be between the outer surface 554 and the central portion 680, and a second subset of the drop-off plies 674B can be between the central portion 680 and the inner surface 552. In this arrangement, the tips 676 of the first subset of the drop-off plies 674B are arranged in a pattern that substantially mirrors a pattern of the tips 676 of the second subset of the drop-off plies 674B. In other words, with reference to the central portion 680, the respective positions of the tips 676 of the first subset of the drop-off plies 674B are (i) reversely and (ii) similarly (or identically) arranged in comparison to the respective positions of the tips 676 of the second subset of the drop-off plies 674B.

For example, in FIG. 5, the central portion 680 can include the plies $674_{i=15, 16}$, the first subset of the drop-off plies 674B can include the plies $674_{i=7, 9, 11, 13}$, and the second subset of the drop-off plies 674B can include the plies $674_{i=18, 20, 22, 24}$. As shown in FIG. 5, the pattern of the tips 676 of the first subset of the drop-off plies 674B substantially mirrors the pattern of the tips 676 of the second subset of the drop-off plies 674B. For instance, with reference to the central portion 680, the respective positions of the tips 676 of the first subset are reversely and similarly arranged in comparison to the respective positions of the tips 676 of the second subset.

Additionally, as shown in FIG. 5, the pattern of the tips 676 of the drop-off plies 674B can be a monotonically-outward pattern. For instance, in FIG. 5, the first subset of the drop-off plies 674B can be in an order from a drop-off ply 674B closest to the central portion 680 (e.g., the ply $674_{i=13}$) to a drop-off ply 674B closest to the outer surface 554 (i.e., the ply $674_{i=7}$). The pattern of the tips 676 of the first subset of the drop-off plies 674B can include, with each successive drop-off ply 674B in the order, a relative distance between the tip 676 of the drop-off ply 674B and the second end 670B decreases. As such, in FIG. 5, (i) the tip 676 of the ply $674_{i=13}$ is at a first distance from the second end 670B, (ii) the tip 676 of the ply $674_{i=11}$ is at a second distance from the second end 670B, which is less than the first distance, (iii) the tip 676 of the ply $674_{i=9}$ is at a third distance from the second end 670B, which is less than the second distance, and (iv) the tip 676 of the ply $674_{i=7}$ is at a fourth distance from the second end 670B, which is less than the third distance.

Similarly, the second subset of the drop-off plies 674B can be in an order from a drop-off ply 674B closest to the central portion 680 (e.g., the ply $674_{i=18}$) to a drop-off ply 674B closest to the inner surface 552 (e.g., the ply $674_{i=24}$). The pattern of the tips 676 of the second subset of the drop-off plies 674B includes, with each successive drop-off ply 674B in the order, a relative distance between the tip 676 of the drop-off ply 674B and the second end 670B decreases. As such, in FIG. 5, (v) the tip 676 of the ply $674_{i=18}$ is at a fifth distance from the second end 670B, (vi) the tip 676 of the ply $674_{i=20}$ is at a sixth distance from the second end 670B, which is less than the fifth distance, (vii) the tip 676 of the ply $674_{i=22}$ is at a seventh distance from the second end 670B, which is less than the sixth distance, and (viii) the tip 676 of the ply $674_{i=24}$ is at an eighth distance from the second end 670B, which is less than the seventh distance.

Accordingly, in the monotonically-outward pattern of the tips 676 shown in FIG. 5, the tips 676 of the drop-off plies 674B generally appear to be spread outward from the central portion 680 in a direction from the first end 670A to the second end 670B. The monotonically-outward pattern of the tips 676 can help to more gradually and/or smoothly transition from the first gage 672A at the first end 670A to the second gage 672B at the second end 670B. Additionally, for example, the monotonically-outward pattern of the tips 676 can help to achieve a relatively greater degree of symmetry relative to, for instance, the arrangement of the tips 576 in FIG. 4 (which are clustered near the outer surface 454).

According to an additional or alternative aspect of the monotonically-outward pattern shown in FIG. 5, the drop-off plies 674B can be arranged in a plurality of pairs of drop-off plies 674B that define an order in which the drop-off plies 674B drop off in a direction from the first end 670A toward the second end 670B (i.e., an order of the respective positions of the tips 676 in the direction from the first end 670A toward the second end 670B). In particular, each pair of drop-off plies 674B can include a respective one drop-off ply 674B of the first subset and a respective one drop-off ply 674B of the second subset.

For example, in FIG. 5, a first pair includes the plies $674_{i=13, 18}$, a second pair includes the plies $674_{i=11, 20}$, a third pair includes the plies $674_{i=9, 22}$, and a fourth pair includes the plies $674_{i=7, 24}$. As shown in FIG. 5, in the direction from the first end 670A to the second end 670B, the drop-off plies 674B drop off in an order from the first pair to the fourth pair. In other words, the tips 676 of the first pair of the drop-off plies 674B are closest to the first end 670A, the tips 676 of the second pair of the drop-off plies 674B are second closest to the first end 670A, the tips 676 of the third pair of the drop-off plies 674B are third closest to the first end 670A, and the tips 676 of the fourth pair of the drop-off plies 674B are farthest from the first end 670A.

Additionally, for example, for each pair of drop-off plies 674B, the respective one drop-off ply 674B of the first subset and the respective one drop-off ply 674B of the second subset can be substantially equidistant from the central portion 680 in a dimension between the outer surface 554 and the inner surface 552. For instance, as shown in FIG. 5, the first pair of the drop-off plies 674B are each spaced from the central portion 680 by a distance equal to a ply thickness 682 of a single ply $674_i$, the second pair of the drop-off plies 674B are each spaced from the central portion 680 by a distance equal to three times the ply thickness 682, the third pair of the drop-off plies 674B are each spaced from the central portion 680 by a distance equal to five times the ply thickness 682, and the fourth pair of the drop-off plies 674B are each spaced from the central portion 680 by a distance equal to seven times the ply thickness 682.

Arranging the drop-off plies 674B in pairs that (i) drop off, pair-by-pair, in an order from the first end 670A to the second end 670B, and/or (ii) are equidistant relative to the central portion 680 can additionally help to more gradually and/or smoothly transition from the first gage 672A at the first end 670A to the second gage 672B at the second end 670B, and/or achieve a relatively greater degree of symmetry relative to, for instance, the arrangement of the tips 576 in FIG. 4 (which are clustered near the outer surface 454).

Within examples, each drop-off ply 674B can have a ply angle, relative to a longitudinal axis of the composite structure 670 (e.g., the longitudinal axis 449), which is between approximately −30 degrees and +30 degrees. This can help to achieve a desired stiffness with a relatively few (or minimal) quantity of plies $674_i$ and, thus, reduce (or may minimize) a weight and/or cost of fabricating the composite structure 670. In an example, for each pair, the ply angle is approximately the same for the drop-off plies 674B of the pair. This can help to improve (or may maximize) a symmetry of the composite structure 670.

According to an additional or alternative aspect of the monotonically-outward pattern shown in FIG. 5, the monotonically-outward pattern can include, along a direction from the first end 670A to the second end 670B, the tips 676 of the first subset of the drop-off plies 674B alternating with the tips 676 of the second subset of the drop-off plies 674B. For example, in FIG. 5, the tips 676 of the drop-off plies 674B are in the following order from the first end 670A to the second end 670B: (i) the tip 676 of the ply $674_{i=18}$ from the second subset, (ii) the tip 676 of the ply $674_{i=13}$ from the first subset, (iii) the tip 676 of the ply $674_{i=20}$ from the second subset, (iv) the tip 676 of the ply $674_{i=11}$ from the first subset, (v) the tip 676 of the ply $674_{i=22}$ from the second subset, (vi) the tip 676 of the ply $674_{i=9}$ from the first subset, (vii) the tip 676 of the ply $674_{i=24}$ from the second subset, and (viii) the tip 676 of the ply $674_{i=7}$ from the first subset. Alternating the respective positions of the tips 676 of the drop-off plies 674B can additionally or alternatively help to help to more gradually and/or smoothly transition from the first gage 672A at the first end 670A to the second gage 672B at the second end 670B.

As noted above, arranging the drop-off plies 674B such that the tips 676 of the drop-off plies 674B are staggered relative to each other can additionally or alternatively help to reduce (or may prevent) ply kinks and/or wrinkles, reduce (or may prevent) resin pockets, and/or increase (or may maximize) interlaminar strength. As an example, in FIG. 5, the respective positions of the tips 676 of the drop-off plies 674B can be staggered from the first end 670A to the second end 670B. By "staggered", it is meant that the tips 676 of the drop-off plies 674B are each at a respective distance from the second end 670B, and the respective distances between the tips 676 and the second end 670B are all different from each other (i.e., the tips of no two drop-off plies are equidistant from the second end 670B). Staggering the tips 676 of the drop-off plies 674B can help to mitigate some or all of the challenges associated with a clustered arrangement of drop-off plies described above.

Also, as noted above, spacing the tips 676 relative to each other by at least one threshold distance can additionally or alternatively help to reduce (or may prevent) ply kinks and/or wrinkles, reduce (or may prevent) resin pockets, and/or increase (or may maximize) interlaminar strength. In an example, for each drop-off ply 674B, a distance 684 between the tip 676 of the drop-off ply 674B and the tip 676 of an adjacent one of the drop-off plies 674B can be at least ten times greater than the ply thickness 682 of the drop-off ply 674B. In this example, for each drop-off ply 674B, the adjacent one of the drop-off plies 674B is adjacent to the drop-off ply 674B in a dimension extending between the outer surface 554 and the inner surface 552. That is, two of the drop-off plies 674B are adjacent to each other only if there is not another one of the drop-off plies 674B between the two of the drop-off plies 674B in the dimension extending between the outer surface 554 and the inner surface 552. Thus, for example, the ply $674_{i=18}$ is adjacent to the ply $674_{i=16}$ and the ply $674_{i=20}$, and non-adjacent to the other drop-off plies 674B (i.e., plies $674_{i=7, 9, 11, 13, 22, 24}$).

A representative one of the distances 684 is depicted in FIG. 5 between the tips 676 of the ply $674_{i=18}$ and the ply $674_{i=16}$, which are adjacent to each other. As shown in FIG. 5, the distance 684 between the tip 676 of the ply $674_{i=18}$ and the tip of the ply $674_{i=16}$ is at least ten times greater than the ply thickness 682 of the ply $674_{i=18}$. Similarly, in FIG. 5, the tips 676 of the other adjacent ones of the drop-off plies 674B are separated by respective distances 684 that are at least ten times greater than the ply thickness 682. As described above, arranging the drop-off plies 674B such that the tips 676 of adjacent ones of the drop-off plies 674B are separated by the distance 684 of at least ten times the ply thickness 682 can help to reduce (or may prevent) ply kinks and/or wrinkles, reduce (or may prevent) resin pockets, and/or increase (or may maximize) interlaminar strength.

Additionally or alternatively, for example, a distance 686 between non-adjacent ones of the drop-off plies 674B can be at least three times greater than the ply thickness 682 of each drop-off ply 674B. A representative one of the distances 686 is depicted in FIG. 5 between the tips 676 of the ply $674_{i=18}$ and the ply $674_{i=13}$, which are non-adjacent to each other (e.g., because the ply $674_{i=16}$ is between the ply $674_{i=18}$ and the ply $674_{i=13}$). As shown in FIG. 5, the distance 686 between the tip 676 of the ply $674_{i=18}$ and the tip of the ply $674_{i=13}$ is at least three times greater than the ply thickness 682 of the ply $674_{i=18}$. Similarly, the tips 676 of the other non-adjacent ones of the drop-off plies 674B are separated by respective distances 686 that are at least three times greater than the ply thickness 682. As described above, arranging the drop-off plies 674B such that the tips 676 of non-adjacent ones of the drop-off plies 674B are separated by the distance 684 of at least three times the ply thickness 682 can help to reduce (or may prevent) ply kinks and/or wrinkles, reduce (or may prevent) resin pockets, and/or increase (or may maximize) interlaminar strength.

In FIG. 5, the ply thickness 682 is the same for all of the plies $674_i$. However, in another example, one or more of the plies $674_i$ can have a different ply thickness than another one of the plies $674_i$. In some implementations, providing the plies $674_i$ with different ply thicknesses can help to provide relatively greater flexibility for achieving fabrication quality objectives.

Additionally, in FIG. 5, the tips 676 of the drop-off plies 674B all have the tapered shape. However, in another example, one or more of the tips 676 of the drop-off plies 674B can have the blunt-end shape shown in FIG. 4. Although the tapered shape can be beneficial for at least the reasons described above, a composite structure including the drop-off plies 674B having the tips 576 with the blunt-end shape in a pattern having one or more of the characteristics described above with respect to FIG. 5 can provide improvements over the composite structure 570 shown in FIG. 4. Similarly, a composite structure including the drop-off plies 574B arranged in the pattern shown in FIG. 4, but with the tips 676 having the tapered shape can provide improvements over the composite structure 570 shown in FIG. 4. Accordingly, within examples, the drop-off plies 574B, 674B can the tips 676 with the tapered shape and/or the tips 576 with the blunt-end shape, and the drop-off plies 574B, 674B can be arranged in a clustered pattern (as shown in FIG. 4) and/or a pattern having one or more of the characteristics described above with respect to FIG. 5.

As described, arranging the tips 676 of the drop-off plies 674B in a pattern having one or more of the characteristics described above can help to achieve a relatively greater degree of symmetry for the composite structure 670 (e.g., about the central portion 680) relative to, for instance, the arrangement of the tips 576 in FIG. 4. As used herein, the term "symmetry" is intended to be a relative term and does not mean exactly symmetric. For example, as shown in FIG. 5, the composite structure 670 includes 14 plies $674_i$ between the central portion 680 and the outer surface 554, and 12 plies $674_i$ between the central portion 680 and the inner surface 552. However, in the context of this disclosure, the composite structure 670 shown in FIG. 5 has a greater degree of symmetry relative to the composite structure 570 shown in FIG. 4.

Within examples, providing the composite structure 670 with a relatively greater degree of symmetry about the central portion 680 can help to increase (or may maximize) interlaminar strength. Additionally or alternatively, providing the composite structure 670 with a relatively greater degree of symmetry about the central portion 680 can help to reduce (or may minimize) re-curing, tooling, material handling costs, and/or weight.

As described above, FIG. 5 shows the composite structure 670 with the drop-off plies 674B arranged in an example pattern having one or more characteristics that can help to improve performance, reduce re-curing, reduce tooling, reduce material handling costs, and/or reduce a weight of the composite structure 670. Other example patterns having the one or more characteristics are also possible. For instance, FIG. 6 shows a composite structure 770 having a variable gage according to another example. As shown in FIG. 6, the composite structure 770 includes a first end 770A having a first gage 772A and a second end 770B having a second gage 772B, which is less than the first gage 772A of the first end 770A. Additionally, as shown in FIG. 6, the composite structure 770 includes an inner surface 652 extending from the first end 770A to the second end 770B, and an outer surface 654 extending from the first end 770A to the second end 770B.

As also shown in FIG. 6, the composite structure 770 includes a plurality of plies $774_{i=1}$ to $774_{i=n}$ of composite material (hereinafter collectively referred to as "plies $774_i$") arranged in a stack between the inner surface 652 and the outer surface 654, where n is an integer value that is greater than or equal to two. In FIG. 6, the composite structure 770 includes a total of 28 plies $774_i$ (i.e., n=28). However, in other examples, the composite structure 770 can include a lesser quantity or a greater quantity of plies $774_i$.

In this arrangement, the first gage 772A of the first end 770A and the second gage 772B of the second end 770B are respective thicknesses between the inner surface 652 and the outer surface 654 at the first end 770A and the second end 770B, respectively. Further, the first gage 772A is related to a quantity of the plies $774_i$ at the first end 770A and the second gage 772B is related to a quantity of the plies $774_i$ at the second end 770B. For instance, in FIG. 6, the quantity of the plies $774_i$ at the first end 770A is greater than the quantity of the plies $774_i$ at the second end 770B such that the first gage 772A is greater than the second gage 772B.

As described above, the variable gage of the composite structure 770 results from the plies $774_i$ of composite material including a plurality of continuous plies 774A and a plurality of drop-off plies 774B arranged in the stack between the inner surface 652 and the outer surface 654. In FIG. 6, each continuous ply 774A extends from the first end 770A to the second end 770B. Whereas, each drop-off ply 774B includes a tip 776, and each drop-off ply 774B extends from the first end 770A to a respective position of the tip 776 of the drop-off ply 774B between the first end 770A and the second end 770B.

For clarity of illustration, in FIG. 6, a representative subset of the continuous plies 774A are labeled with reference number 774A and a representative subset of the drop-off plies 774B are labeled with reference number 774B. However, each of the plies $774_i$ that extends entirely from the first end 770A to the second end 770B is one of the continuous plies 774A, and each of the plies $774_i$ that terminates between the first end 770A and the second end 770B is one of the drop-off plies 774B. Specifically, in FIG. 6, the plies $774_{i=1-4,6,8,10,12,14,15,17,19,21,23,25-28}$ are the continuous plies 774A, and the plies $774_{i=5,7,9,11,13,16,18,20,22,24}$ are the drop-off plies 774B.

As shown in FIG. 6, the tip 776 of each drop-off ply 774B has the tapered shape described above with respect to the tips 676 shown in FIG. 5. As such, the tips 776 having the tapered shape can reduce (or may minimize) resin pockets at the tips 776 of the drop-off plies 774B, which can help to improve (or may maximize) interlaminar strength of the composite structure 770. However, in other examples, one or more of the drop-off plies 774B can have the blunt-end shape shown in FIG. 4.

As noted above, the load bearing performance of the composite structure 770 can be enhanced, additionally or alternatively, based on the pattern in which the plies $774_i$ are arranged in the composite structure 770. For example, in FIG. 6, the drop-off plies 674B can be separated from each other by at least one of the continuous plies 774A. For instance, each drop-off ply 774B can be sandwiched between and abut against a respective two continuous plies 774A of the plurality of continuous plies 774A. By separating the drop-off plies 774B from each other and/or sandwiching the drop-off plies 774B between the continuous plies 774A, the drop-off plies 774B can be more uniformly distributed between the inner surface 652 and the outer surface 654 (as compared to the clustered arrangement of the drop-off plies 574B shown in FIG. 4). This can help to reduce (or may prevent) ply kinks and/or wrinkles, reduce (or may prevent) resin pockets, and/or increase (or may maximize) interlaminar strength of the composite structure 770.

Within examples, the pattern of the tips 776 of the drop-off plies 674B can additionally or alternatively include one or more of the following characteristics: (i) an arrangement of the tips 776 in a first half of the composite structure 770 in a pattern that mirrors a pattern of the tips 776 in a second half of the composite structure 770, (ii) a staggered arrangement of the tips 776 relative to each other, and/or (iii) spacing the tips 776 relative to each other by at least one threshold distance. As described above, each of these characteristics alone or in combination can contribute to arranging the drop-off plies 774B in a pattern that can reduce (or may prevent) ply kinks and/or wrinkles, reduce (or may prevent) resin pockets, and/or increase (or may maximize) interlaminar strength.

FIG. 6 shows the tips 776 arranged in mirror patterns relative to a central portion 780 of the composite structure 770 according to another example. The central portion 780 can include one or more of the plies $774_i$ that provide a frame of reference for characterizing patterns of the tips 776 of the drop-off plies 774B on opposing sides of the central portion 780. As noted above, in general, the central portion 780 (i) is between the inner surface 652 and the outer surface 654 and (ii) extends from the first end 770A to the second end 770B.

In FIG. 6, the central portion 780 can include the plies $774_{i=14,15}$. Thus, in FIG. 6, the central portion 780 can include two continuous plies 774A. However, in another example, the central portion 780 can include two drop-off plies 774B and at least one continuous ply 774A. In yet another example, the central portion 780 can consist of only a single drop-off ply 774B. In another example, the central portion 780 can consist of at least one continuous ply 774A and omit the drop-off plies 774B. More generally, the central portion 780 can include one or more of the continuous plies 774A and/or one or more of the drop-off plies 774B.

Also, as shown in FIG. 6, the tips 776 of the drop-off plies 774B can be arranged in mirror patterns relative to the central portion 780. For instance, a first subset of the drop-off plies 774B can be between the outer surface 654 and the central portion 780, and a second subset of the drop-off plies 774B can be between the central portion 780 and the inner surface 652. In this arrangement, the tips 776 of the first subset of the drop-off plies 774B are arranged in a pattern that substantially mirrors a pattern of the tips 776 of the second subset of the drop-off plies 774B. In other words, with reference to the central portion 780, the respective positions of the tips 776 of the first subset of the drop-off plies 774B are (i) reversely and (ii) similarly (or identically) arranged in comparison to the respective positions of the tips 776 of the second subset of the drop-off plies 774B.

For example, in FIG. 6, the central portion 780 can include the plies $774_{i=14,15}$, the first subset of the drop-off plies 774B can include the plies $774_{i=5, 7, 9, 11, 13}$, and the second subset of the drop-off plies 774B can include the plies $774_{i=16, 18, 20, 22, 24}$. As shown in FIG. 6, the pattern of the tips 776 of the first subset of the drop-off plies 774B substantially mirrors the pattern of the tips 776 of the second subset of the drop-off plies 774B. For instance, with reference to the central portion 780, the respective positions of the tips 776 of the first subset are reversely and similarly arranged in comparison to the respective positions of the tips 776 of the second subset.

As described above, FIG. 5 shows the pattern of the tips 676 of the drop-off plies 674B as a monotonically-outward pattern. FIG. 6 shows the tips 776 of the drop-off plies 774B arranged in a monotonically-inward pattern, according to an example. In a first order of the first subset of the drop-off plies 774B from the outer surface 654 toward the central portion 780, with each successive drop-off ply 774B in the first order, a relative distance between the tip 776 of the drop-off ply 774B and the second end 770B decreases. Also, in a second order of the second subset of the drop-off plies 774B from the inner surface 652 toward the central portion 780, with each successive drop-off ply 774B in the second order, a relative distance between the tip 776 of the drop-off ply 774B and the second end 770B decreases.

As such, in FIG. 6, (i) the tip 776 of the ply $674_{i=5}$ is at a first distance from the second end 770B, (ii) the tip 776 of the ply $774_{i=7}$ is at a second distance from the second end 770B, which is less than the first distance, (iii) the tip 776 of the ply $774_{i=9}$ is at a third distance from the second end 770B, which is less than the second distance, (iv) the tip 776 of the ply $774_{i=11}$ is at a fourth distance from the second end 770B, which is less than the third distance, and (v) the tip 776 of the ply $774_{i=13}$ is at a fifth distance from the second end 770B, which is less than the fourth distance. Also, in FIG. 6, (vi) the tip 776 of the ply $774_{i=24}$ is at a sixth distance from the second end 770B, (vii) the tip 776 of the ply $774_{i=22}$ is at a seventh distance from the second end 770B, which is less than the sixth distance, (viii) the tip 776 of the ply $774_{i=20}$ is at an eighth distance from the second end 770B, which is less than the seventh distance, (ix) the tip 776 of the ply $774_{i=18}$ is at a ninth distance from the second end 770B, which is less than the eighth distance, and (x) the tip 776 of the ply $774_{i=16}$ is at a tenth distance from the second end 770B, which is less than the ninth distance.

Accordingly, in the monotonically-inward pattern of the tips 776 shown in FIG. 6, the tips 776 of the drop-off plies 774B generally appear to be converge inward from the outer surface 654 and the inner surface 652 toward the central portion 780 in a direction from the first end 770A to the second end 770B. The monotonically-inward pattern of the tips 776 can help to more gradually and/or smoothly transition from the first gage 772A at the first end 770A to the second gage 772B at the second end 770B. Additionally, for example, the monotonically-inward pattern of the tips 776 can help to achieve a relatively greater degree of symmetry relative to, for instance, the arrangement of the tips 576 in FIG. 4 (which are clustered near the outer surface 454).

According to an additional or alternative aspect of the monotonically-inward pattern shown in FIG. 6, the drop-off plies 774B can be arranged in a plurality of pairs of drop-off plies 774B that define an order in which the drop-off plies 774B drop off in a direction from the first end 770A toward the second end 770B (i.e., an order of the respective positions of the tips 776 in the direction from the first end 770A toward the second end 770B). In particular, each pair of drop-off plies 774B can include a respective one drop-off ply 774B of the first subset and a respective one drop-off ply 774B of the second subset.

For example, in FIG. 6, a first pair includes the plies $774_{i=5, 24}$, a second pair includes the plies $774_{i=7, 22}$, a third pair includes the plies $774_{i=9, 20}$, a fourth pair includes the plies $774_{i=11, 18}$, and a fifth pair includes the plies $774_{i=13, 16}$. As shown in FIG. 6, in the direction from the first end 770A to the second end 770B, the drop-off plies 774B drop off in an order from the first pair to the fifth pair. In other words, the tips 776 of the first pair of the drop-off plies 774B are closest to the first end 770A, the tips 776 of the second pair of the drop-off plies 774B are second closest to the first end 770A, the tips 776 of the third pair of the drop-off plies 774B are third closest to the first end 770A, the tips 776 of the fourth pair of the drop-off plies 774B are second farthest from the first end 770A, and the tips 776 of the fifth pair of the drop-off plies 774B are farthest from the first end 770A.

Additionally, for example, for each pair of drop-off plies 774B, the respective one drop-off ply 774B of the first subset and the respective one drop-off ply 774B of the second subset can be equidistant from the central portion 780 in a dimension between the outer surface 654 and the inner surface 652. For instance, as shown in FIG. 6, the first pair of the drop-off plies 774B are each spaced from the central portion 780 by a distance equal to eight times a ply thickness 782 of a single ply $774_i$, the second pair of the drop-off plies 774B are each spaced from the central portion 780 by a distance equal to six times the ply thickness 782, the third pair of the drop-off plies 774B are each spaced from the central portion 780 by a distance equal to four times the ply thickness 782, the fourth pair of the drop-off plies 774B are each spaced from the central portion 780 by a distance equal to two times the ply thickness 782, and the fifth pair of the drop-off plies 774B are each immediately adjacent to and abut against the central portion 780.

Arranging the drop-off plies 774B in pairs that (i) drop off, pair-by-pair, in an order from the first end 770A to the second end 770B, and/or (ii) are equidistant relative to the central portion 780 can additionally help to more gradually and/or smoothly transition from the first gage 772A at the first end 770A to the second gage 772B at the second end 770B, and/or achieve a relatively greater degree of symmetry relative to, for instance, the arrangement of the tips 576 in FIG. 4 (which are clustered near the outer surface 454).

According to an additional or alternative aspect of the monotonically-inward pattern shown in FIG. 6, the monotonically-inward pattern can include, along a direction from the first end 770A to the second end 770B, the tips 776 of the first subset of the drop-off plies 774B alternating with the tips 776 of the second subset of the drop-off plies 774B. For example, in FIG. 6, the tips 776 of the drop-off plies 774B are in the following order from the first end 770A to the second end 770B: (i) the tip 776 of the ply $774_{i=5}$ from the first subset, (ii) the tip 776 of the ply $774_{i=24}$ from the second subset, (iii) the tip 776 of the ply $774_{i=7}$ from the first subset, (iv) the tip 776 of the ply $774_{i=22}$ from the second subset, (v) the tip 776 of the ply $774_{i=9}$ from the first subset, (vi) the tip 776 of the ply $774_{i=20}$ from the second subset, (vii) the tip 776 of the ply $774_{i=11}$ from the first subset, (viii) the tip 776 of the ply $774_{i=18}$ from the second subset, (ix) the tip 776 of the ply $774_{i=13}$ from the first subset, and (x) the tip 776 of the ply $774_{i=16}$ from the second subset. Alternating the respective positions of the tips 776 of the drop-off plies 774B can additionally or alternatively help to help to more gradually and/or smoothly transition from the first gage 772A at the first end 770A to the second gage 772B at the second end 770B.

As noted above, arranging the drop-off plies 774B such that the tips 776 of the drop-off plies 774B are staggered relative to each other can additionally or alternatively help to reduce (or may prevent) ply kinks and/or wrinkles, reduce (or may prevent) resin pockets, and/or increase (or may maximize) interlaminar strength. As an example, in FIG. 6, the respective positions of the tips 776 of the drop-off plies 774B can be staggered from the first end 770A to the second end 770B. By "staggered", it is meant that the tips 776 of the drop-off plies 774B are each at a respective distance from the second end 770B, and the respective distances between the tips 776 and the second end 770B are all different from each other (i.e., the tips of no two drop-off plies are equidistant from the second end 770B). Staggering the tips 776 of the drop-off plies 774B can help to mitigate some or all of the challenges associated with a clustered arrangement of drop-off plies described above.

Also, as noted above, spacing the tips 776 relative to each other by at least one threshold distance can additionally or alternatively help to reduce (or may prevent) ply kinks and/or wrinkles, reduce (or may prevent) resin pockets, and/or increase (or may maximize) interlaminar strength. In an example, for each drop-off ply 774B, a distance 784 between the tip 776 of the drop-off ply 774B and the tip 776 of an adjacent one of the drop-off plies 774B can be at least ten times greater than the ply thickness 782 of the drop-off ply 774B. In this example, for each drop-off ply 774B, the adjacent one of the drop-off plies 774B is adjacent to the drop-off ply 774B in a dimension extending between the outer surface 654 and the inner surface 652. For instance, as described above, two of the drop-off plies 774B are adjacent to each other only if there is not another one of the drop-off plies 774B between the two of the drop-off plies 774B in the dimension extending between the outer surface 654 and the inner surface 652. Thus, for example, the ply $774_{i=7}$ is adjacent to the ply $774_{i=5}$ and the ply $774_{i=9}$, and non-adjacent to the other drop-off plies 774B (i.e., plies $674_{i=11, 13, 16, 18, 20, 22, 24}$).

A representative one of the distances 784 is depicted in FIG. 6 between the tips 776 of the ply $774_{i=7}$ and the ply $774_{i=5}$, which are adjacent to each other. As shown in FIG. 6, the distance 784 between the tip 776 of the ply $774_{i=7}$ and the tip of the ply $774_{i=5}$ is at least ten times greater than the ply thickness 782 of the ply $774_{i=7}$. Similarly, in FIG. 6, the tips 776 of the other adjacent ones of the drop-off plies 774B are separated by respective distances 784 that are at least ten times greater than the ply thickness 782. As described above, arranging the drop-off plies 774B such that the tips 776 of adjacent ones of the drop-off plies 774B are separated by the distance 784 of at least ten times the ply thickness 782 can help to reduce (or may prevent) ply kinks and/or wrinkles, reduce (or may prevent) resin pockets, and/or increase (or may maximize) interlaminar strength.

Additionally or alternatively, for example, a distance 786 between non-adjacent ones of the drop-off plies 774B can be at least three times greater than the ply thickness 782 of each drop-off ply 774B. A representative one of the distances 786 is depicted in FIG. 6 between the tips 776 of the ply $774_{i=7}$ and the ply $774_{i=22}$, which are non-adjacent to each other (e.g., because the plies $774_{i=9, 11, 13, 16, 18, 20}$ are between the ply $774_{i=7}$ and the ply $774_{i=22}$). As shown in FIG. 6, the distance 786 between the tip 776 of the ply $774_{i=7}$ and the tip of the ply $774_{i=22}$ is at least three times greater than the ply thickness 782 of the ply $774_{i=7}$. Similarly, the tips 776 of the other non-adjacent ones of the drop-off plies 774B are separated by respective distances 786 that are at least three times greater than the ply thickness 782. As described above, arranging the drop-off plies 774B such that the tips 776 of non-adjacent ones of the drop-off plies 774B are separated by the distance 784 of at least three times the ply thickness 782 can help to reduce (or may prevent) ply kinks and/or wrinkles, reduce (or may prevent) resin pockets, and/or increase (or may maximize) interlaminar strength.

In FIG. 6, the ply thickness 782 is the same for all of the plies $774_i$. However, in another example, one or more of the plies $774_i$ can have a different ply thickness than another one of the plies $774_i$. In some implementations, providing the plies $774_i$ with different ply thicknesses can help to provide relatively greater flexibility for achieving fabrication quality objectives.

Additionally, in FIG. 6, the tips 776 of the drop-off plies 774B all have the tapered shape. However, in another example, one or more of the tips 776 of the drop-off plies 774B can have the blunt-end shape of the tips 576 shown in FIG. 4. Although the tapered shape can be beneficial for at least the reasons described above, a composite structure including the drop-off plies 774B having the tips 576 with the blunt-end shape in a pattern having one or more of the characteristics described above with respect to FIG. 6 can provide improvements over the composite structure 570 shown in FIG. 4.

As described above, within examples, the first lower corner portion 434, the first upper corner portion 436, the second upper corner portion 438, and/or the second lower corner portion 440 can include the composite structures 570, 670, 770 described above with respect to FIGS. 5-7. In FIGS. 5-7, the first end 570A, 670A, 770A has the first gage 572A, 672A, 772A, which is greater than the second gage 572B, 672B, 772B at the second end 570B, 670B, 770B. Accordingly, depending on the respective gages of the portions of the composite stringer 420 on opposing sides of the composite structure 570, 670, 770, (i) the first end 570A, 670A, 770A can be located at a first interface between the composite structure 570, 670, 770 and any one of the first skin flange 424, the first web 426, the top flange 428, the second web 430, or the second skin flange 432, and (ii) the second end 570B, 670B, 770B can be located at a second interface between the composite structure 570, 670, 770 and another one of the first skin flange 424, the first web 426, the top flange 428, the second web 430, or the second skin flange 432.

Figure 8:
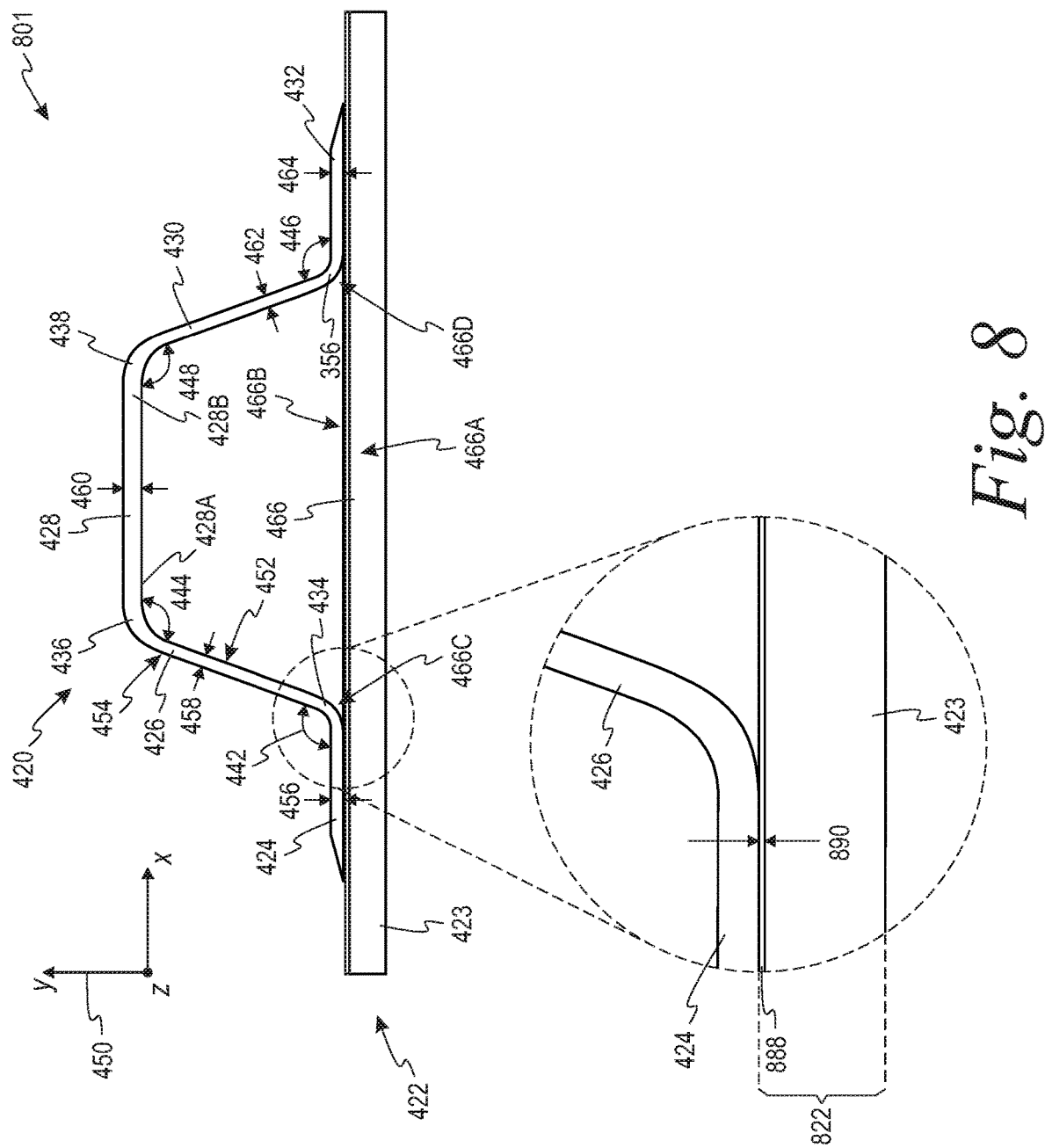
FIG. 8 depicts a side view of a composite structure assembly, according to an example.

As described above, the composite stringer 320, 420 and the base flange 366, 466 are coupled to the support structure 322, 422, which includes the skin 323, 423 of a vehicle, in FIGS. 3A-4B. However, as described above, the support structure 322, 422 can additionally include a base charge in some examples. FIG. 8 depicts a composite stringer assembly 801 including the composite stringer 420 coupled to a support structure 822, according to another example. The composite stringer assembly 801 shown in FIG. 8 is identical to the composite stringer assembly 401 shown in FIGS. 4A-4B, except the support structure 822 includes a base charge 888 and the skin 423 of the vehicle.

The base charge 888 is configured to couple the first skin flange 424, the second skin flange 432, and the base flange 466 to the skin 423 of the vehicle. Within examples, the base charge 888 can include one or more plies of composite material that can help support and cushion the composite stringer 420 and the base flange 466 on the skin 423. In FIG. 8, the base charge 888 extends continuously under an entire surface area of inner surface 452 at the first skin flange 424, an entire surface area of the bottom surface 466A of the base flange 466, and an entire surface area of the inner surface 452 at the second skin flange 432.

As shown in FIG. 8, the base charge 888 can have a seventh gage 890, which is approximately equal to or less than the first gage 456 of the first skin flange 424 and/or the fifth gage 464 of the second skin flange 432. This can help to provide the base charge 888 with a stiffness that is approximately equal to a stiffness of the first skin flange 424 and/or a stiffness of the second skin flange 432. Providing the base charge 888, the first skin flange 424, and/or the second skin flange 432 with approximately the same stiffness can help to enhance (or may maximize) energy absorption due to an impact and/or a load at an interface between (i) the base charge 888 and (ii) the first skin flange 424 or the second skin flange 432. In this way, a bond at the interface between (i) the base charge 888 and (ii) the first skin flange 424 and/or the second skin flange 432.

Also, within examples, at least one of the first skin flange 424, the second skin flange 432, the base flange 466, or the base charge 888 can have a stiffness that is approximately equal to a stiffness of the skin 423 of the vehicle. As described above, this can help to enhance (or may maximize) energy absorption due to an impact and/or a load at an interfaces between the skin 423 of the vehicle, the base charge 888, the first skin flange 424, the base flange 466, and/or the second skin flange 432 (and, thus, mitigate) delamination between the composite stringer 420, the base flange 466, the base charge 888, and the skin 423).

Figure 9A:
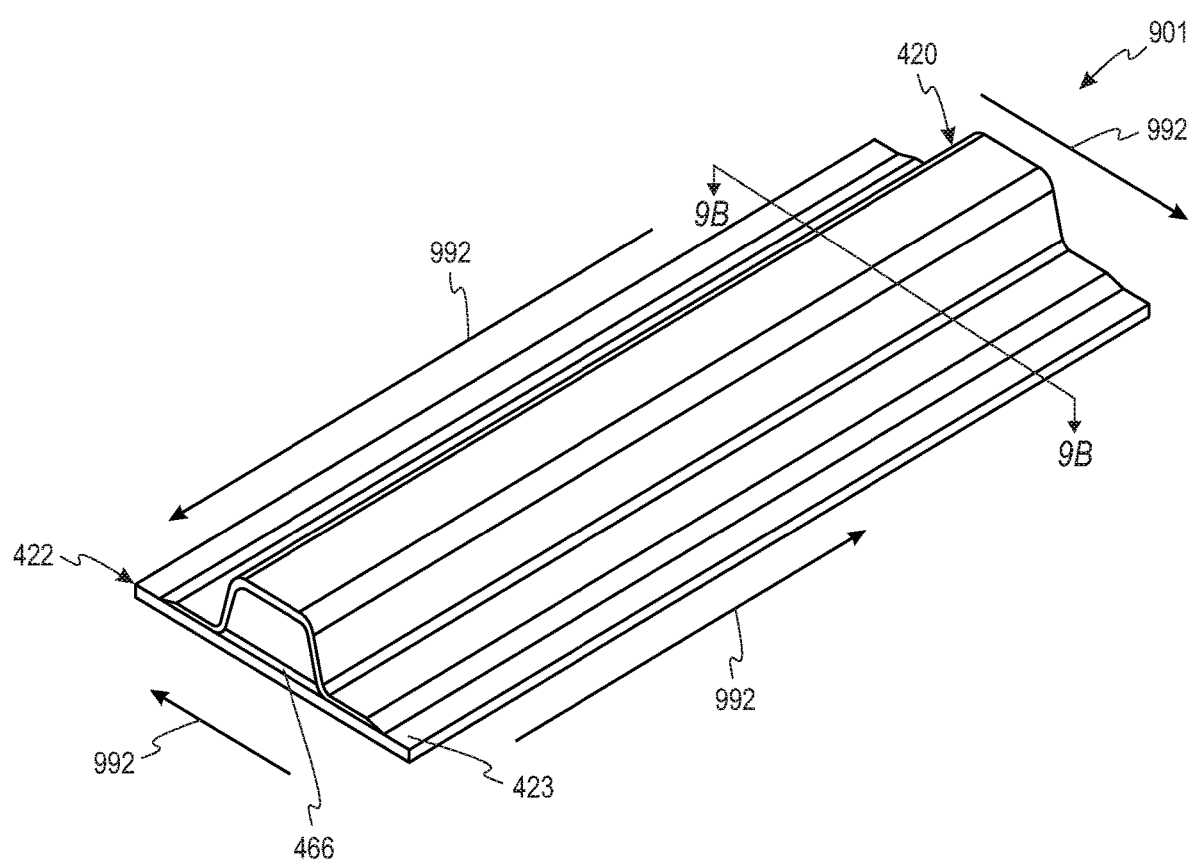
FIG. 9A depicts a perspective view of a composite stringer assembly under an in-plane shear load, according to an example.
Figure 9B:
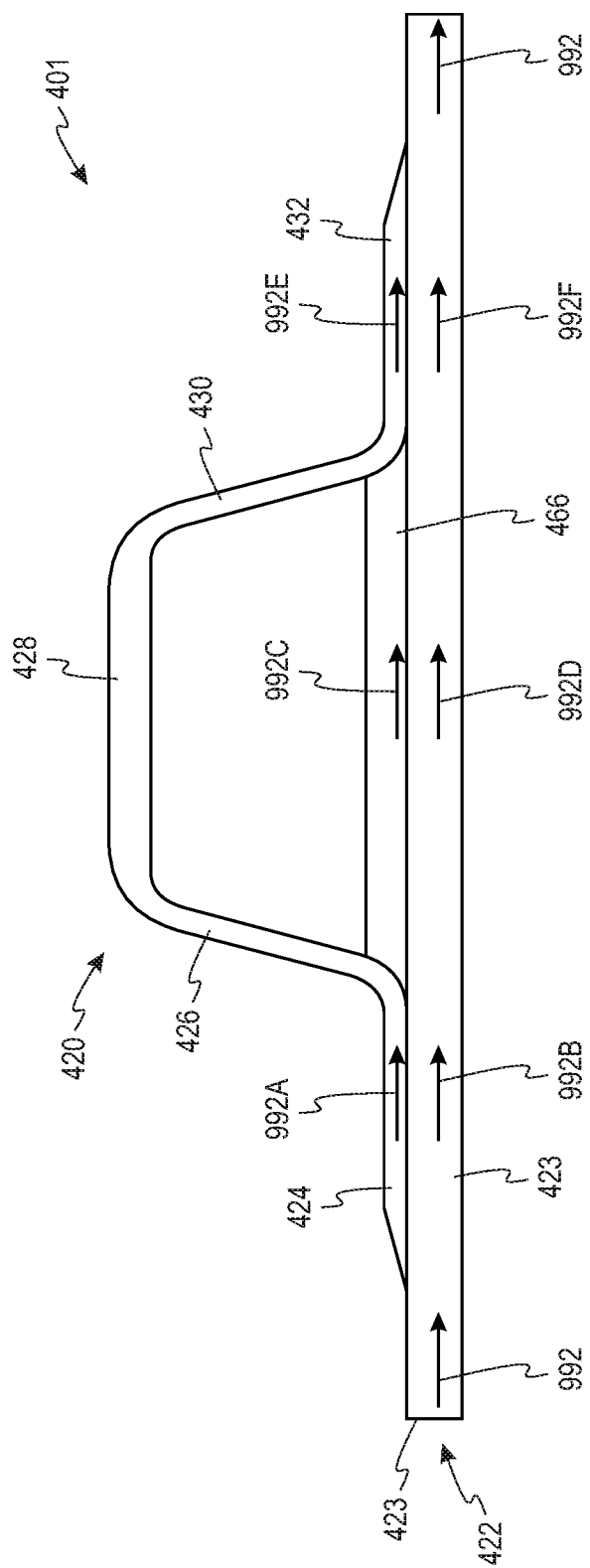
FIG. 9B depicts a cross-sectional view of the composite stringer assembly shown in FIG. 9A, according to an example.

Referring now to FIGS. 9A-9B, a graphical representation of an in-plane shear load 992 transmitted by the composite stringer assembly 401 and the support structure 422 is illustrated according to an example. Although FIGS. 9A-9B depict the composite stringer assembly 401 shown in FIGS. 4A-4B, the concepts described below can also be applied to the composite stringer assembly 301 shown in FIGS. 3A-3B.

FIG. 9A is a perspective view of the in-plane shear load 992, the composite stringer assembly 401, and the support structure 422. As an example, the in-plane shear load 992 shown in FIG. 9A can be generated due to airframe panel twisting such as, for instance, twisting of the skin 423 on the fuselage 110, the wing assembly 112, and/or the empennage 114 shown in FIGS. 1-2.

FIG. 9B is a cross-sectional view of the composite stringer assembly 401 taken through the line 9B in FIG. 9A. As shown in FIG. 9B, the support structure 422 transmits the in-plane shear load 992 toward the composite stringer assembly 401 coupled to the support structure 422. As also shown in FIG. 9B, at least a portion of the in-plane shear load 992 is transmitted continuously through the first skin flange 424, the base flange 466, and the second skin flange 432, while at least another portion of the in-plane shear load 992 is transmitted through the support structure 422 coupled to the first skin flange 424, the base flange 466, and the second skin flange 432.

More particularly, in the X-Y plane of the coordinate system 450, a first a first portion 992A of the in-plane shear load 992 is transmitted through the first skin flange 424 to the base flange 466 while a second portion 992B of the in-plane shear load 992 is transmitted through a portion of the support structure 422 coupled to the first skin flange 424. As described above, the base flange 466 extends between (i) first skin flange 424 and the first web 426 and (ii) the second skin flange 443 and the second web 430 on the other side. In this arrangement, at least the first portion 992A of the in-plane shear load 992 is transmitted from the first skin flange 424 to the base flange 466 through an interface between the first lower corner portion 434 of the composite stringer 420 and the first lateral surface 466C of the base flange 466.

Next, a third portion 992C of the in-plane shear load 992 is transmitted, from the first skin flange 424 to the second skin flange 432, through the base flange 466 while a fourth portion 992D of the in-plane shear load 992 is transmitted through a portion of the support structure 422 coupled to the base flange 466. At least part of the third portion 992C of the in-plane shear load 992 is then transmitted from the base flange 466 to the second skin flange 432 through an interface between the second lateral surface 466D of the base flange 466 and the second lower corner portion 440 of the composite stringer 420. Then, a fifth portion 992E of the in-plane shear load 992 is transmitted through the second skin flange 432 while a sixth portion 992F of the in-plane shear load 992 is transmitted through a portion of the support structure 422 coupled to the second skin flange 432.

In this way, the base flange 466 can provide a continuous structural connection between the first skin flange 424 and the second skin flange 432 that can transmit at least a portion of the in-plane shear load 992 continuously through an entire interface between the composite stringer assembly 401 and the support structure 422. By contrast, a conventional composite stringer assembly that includes a radius filler has a discontinuity in the plane in which the first skin flange and the second skin flange lie (e.g., at the lower corner portions) such that the in-plane shear load 992 cannot be continuously transmitted across the composite stringer assembly. This discontinuity can limit the capability of such composite stringer assemblies to transfer in-plane shear loads, whereas the base flange 466 of the composite stringer assembly 401 can help to enhance transferring relatively greater in-plane shear loads.

In FIG. 9B, a sum of the first portion 992A of the in-plane shear load 992 and the second portion 992B of the in-plane shear load 992 is approximately equal to (i) a sum of the third portion 992C of the in-plane shear load 992 and the fourth portion 992D of the in-plane shear load 992 and (ii) a sum of the fifth portion 992E of the in-plane shear load 992 and the sixth portion 992F of the in-plane shear load 992. Additionally, the sum of the first portion 992A of the in-plane shear load 992 and the second portion 992B of the in-plane shear load 992 is approximately equal to the in-plane shear load 992 that is transmitted toward the composite stringer assembly 401.

In FIG. 9A, the first portion 992A of the in-plane shear load 992 load that is transmitted through the first skin flange 424 is approximately equal to the fifth portion 992E of the in-plane shear load 992 that is transmitted through the second skin flange 932. Additionally, the third portion 992C of the in-plane shear load 992 that is transmitted through the base flange 466 is greater than the first portion 992A of the in-plane shear load 992 that is transmitted through the first skin flange 424 and the fifth portion 992E of the in-plane shear load 992 that is transmitted through the second skin flange 432.

FIGS. 10A-10D depict the composite stringer assembly 401 under an axial compressive load 1094, according to an example. Although FIGS. 10A-10D depict the composite stringer assembly 401 shown in FIGS. 4A-4B, the concepts described below can also be applied to the composite stringer assembly 301 shown in FIGS. 3A-3B.

As shown in FIG. 10A, the composite stringer assembly 401 can receive the axial compression load 1094 on opposing ends (i.e, the first end 453A and the second end 453B) of the composite stringer assembly 401. As shown in FIGS. 10B-10D, responsive to the axial compression load 1094, a plurality of portions 1094A-1094D of the axial compression load 1094 is distributed among the first skin flange 424, the first web 426, the top flange 428, the second web 430, the second skin flange 432, and the base flange 466 such that the first skin flange 424, the first web 426, the top flange 428, the second web 430, the second skin flange 432, and the base flange 466 simultaneously carry the axial compression load 1094 together as an integrated structure.

For example, FIG. 10B shows the first web 426 carrying a first portion 1094A of the axial compression load 1094 and the second web 430 carrying a second portion 1094B of the axial compression load 1094. FIG. 10C shows the top flange 428 carrying a third portion 1094C of the axial compression load 1094. FIG. 10D shows the first skin flange 424, the second skin flange 432, and the base flange 466 cooperating to carry a fourth portion 1094D of the axial compression load 1094. In FIGS. 10B-10D, the axial compression load 1094 is equal to a sum of the first portion 1094A, the second portion 1094B, the third portion 1094C, and the fourth portion 1094D of the axial compression load 1094. Accordingly, this distribution of the axial compression load 1094 over an entirety of the composite stringer assembly 401.

The base flange 466 can provide advantages over conventional composite stringer assemblies that include radius fillers and/or an overwrap (e.g., a relatively thin layer of composite material that extends over the radius fillers). For example, the radius fillers and/or the overwrap can carry a relatively small portion of the axial compression load 1094 as compared to the base flange 466. As a result, the skin flanges, webs, and top flange of a conventional composite stringer assembly must carry a relatively greater portion of the axial compression load 1094 as compared to the first skin flange 424, the first web 426, the top flange 428, the second web 430, and the second skin flange 432 the composite stringer assembly 401 that includes the base flange 466. The base flange 466 can thus increase the capability of the composite stringer assembly 401 to carry axial compression loads.

Within examples, the composite stringers 220 of the aircraft 100 shown in FIG. 2 or another type of vehicle described above can include any of the composite stringers 320, 420 described above. Also, within examples, the aircraft 100 or another type of vehicle described above can include any of the composite stringer assemblies 301, 401 described above.

Figure 11:
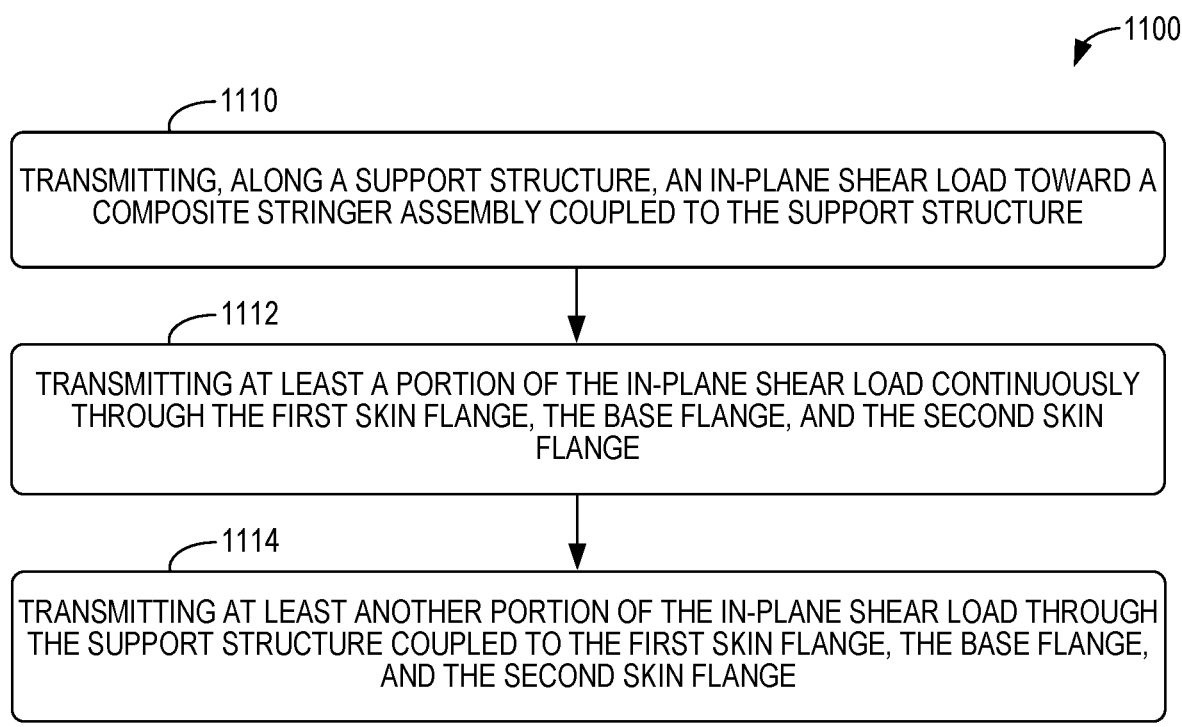
FIG. 11 depicts a process for transmitting an in-plane shear load through a composite stringer assembly, according to an example.

Referring now to FIG. 11, a flowchart for a process 1100 of transmitting an in-plane shear load through a composite stringer assembly is described according to an example. As shown in FIG. 11, at block 1110, the process 1100 includes transmitting, along a support structure, an in-plane shear load toward a composite stringer assembly coupled to the support structure. The support structure includes a skin of a vehicle. The composite stringer assembly includes a composite stringer including: (i) a top flange having a first side and a second side, (ii) a first skin flange coupled to the support structure, (iii) a first web extending between the first skin flange and the first side of the top flange, (iv) a second skin flange coupled to the support structure, and (v) a second web extending between the second skin flange and the second side of the top flange.

The composite stringer assembly also includes a base flange. The base flange includes (a) a bottom surface extending between the first skin flange and the second skin flange, wherein the bottom surface of the base flange is coupled to the support structure, and (b) a top surface extending between the first web and the second web. The first skin flange, the first web, the top flange, the second web, the second skin flange, and the base flange include a plurality of plies of composite material.

Additionally, as shown in FIG. 11, the process 1100 also includes transmitting at least a portion of the in-plane shear load continuously through the first skin flange, the base flange, and the second skin flange at block 1112. At block 1114, the process 1100 includes transmitting at least another portion of the in-plane shear load through the support structure coupled to the first skin flange, the base flange, and the second skin flange.

Figure 12:
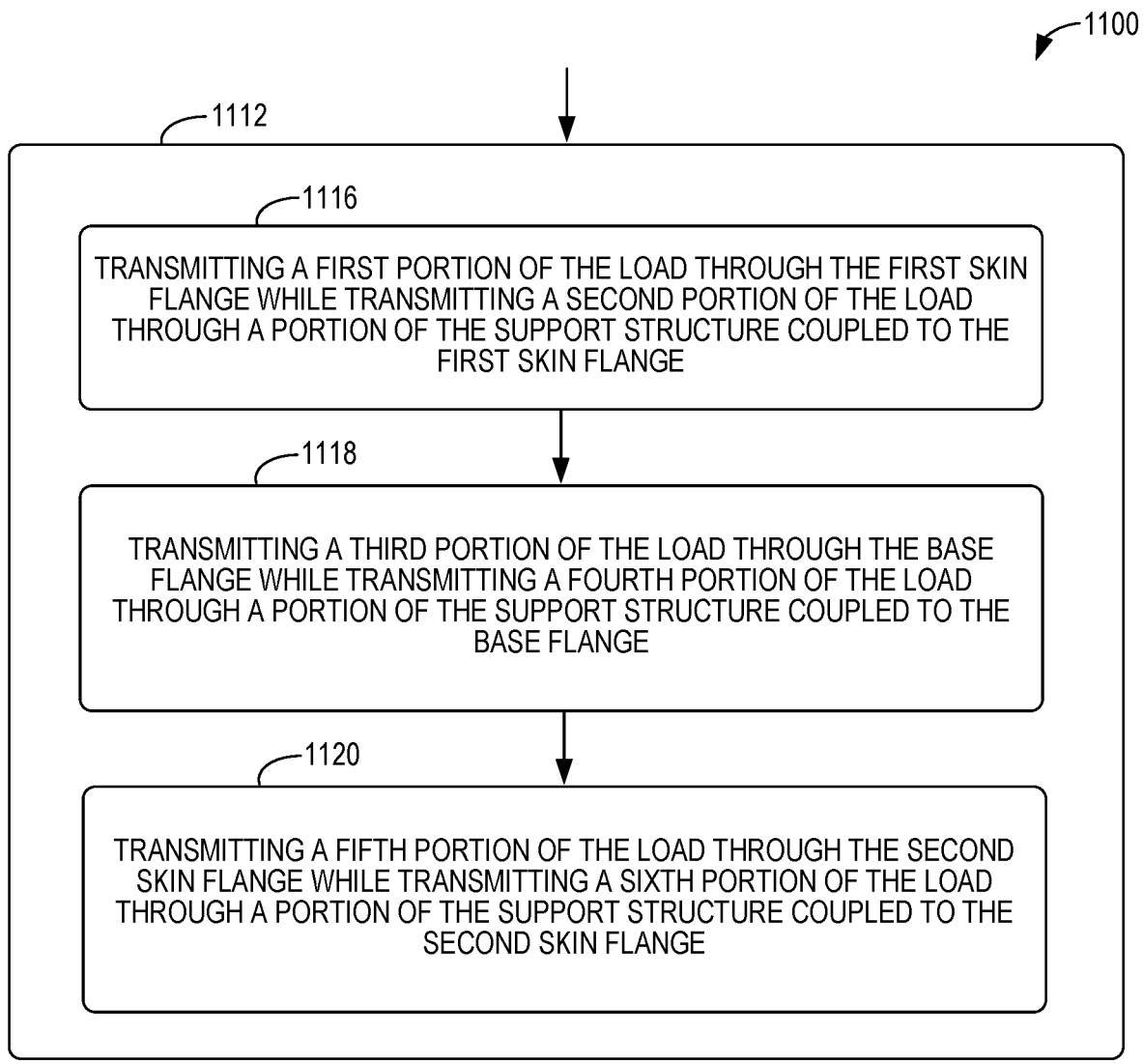
FIG. 12 depicts a process for transmitting an in-plane shear load through a composite stringer assembly that can be used with the process shown in FIG. 11, according to an example.
Figure 13:
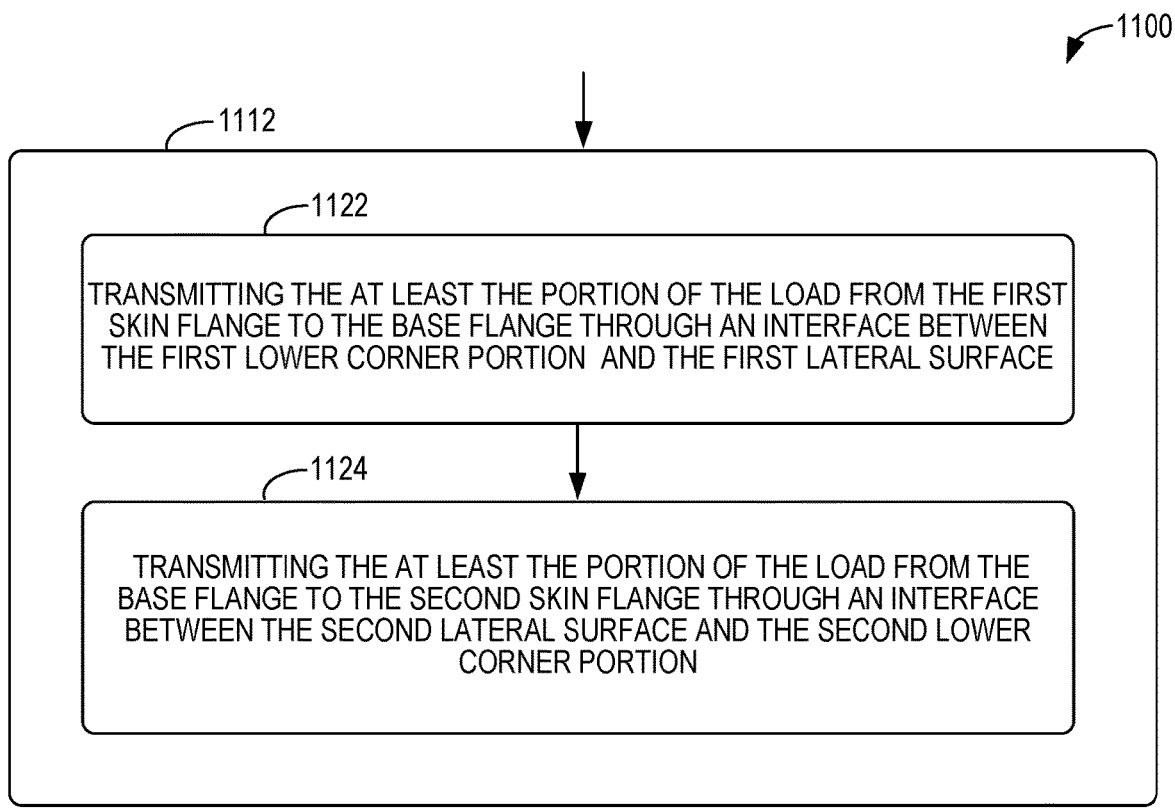
FIG. 13 depicts a process for transmitting an in-plane shear load through a composite stringer assembly that can be used with the process shown in FIG. 11, according to an example.

FIGS. 12-13 depict additional aspects of the process 1100 according to further examples. As shown in FIG. 12, transmitting at least a portion of the in-plane shear load continuously through the first skin flange, the base flange, and the second skin flange at block 1112 can include (i) transmitting a first portion of the in-plane shear load through the first skin flange to the base flange while transmitting a second portion of the in-plane shear load through a portion of the support structure coupled to the first skin flange at block 1116, (ii) transmitting, from the first skin flange to the second skin flange, a third portion of the in-plane shear load through the base flange while transmitting a fourth portion of the in-plane shear load through a portion of the support structure coupled to the base flange at block 1118, and (iii) transmitting, from the base flange, a fifth portion of the in-plane shear load through the second skin flange while transmitting a sixth portion of the in-plane shear load through a portion of the support structure coupled to the second skin flange at block 1120.

In FIG. 13, the composite stringer can further include a first lower corner portion extending from the first skin flange to the first web, and a second lower corner portion extending from the second skin flange to the second web. Also, in FIG. 13, the base flange can further include a first lateral surface extending between the top surface and the bottom surface of the base flange, and a second lateral surface extending between the top surface and the bottom surface of the base flange. The first lateral surface is coupled to the first lower corner portion of the composite stringer, and the second lateral surface is coupled to the second lower corner portion of the composite stringer.

As shown in FIG. 13, transmitting at least a portion of the in-plane shear load continuously through the first skin flange, the base flange, and the second skin flange at block 1112 can include: (i) transmitting the at least the portion of the in-plane shear load from the first skin flange to the base flange through an interface between the first lower corner portion of the composite stringer and the first lateral surface of the base flange at block 1122, and (ii) transmitting the at least the portion of the in-plane shear load from the base flange to the second skin flange through an interface between the second lateral surface of the base flange and the second lower corner portion of the composite stringer at block 1124.

Figure 14:
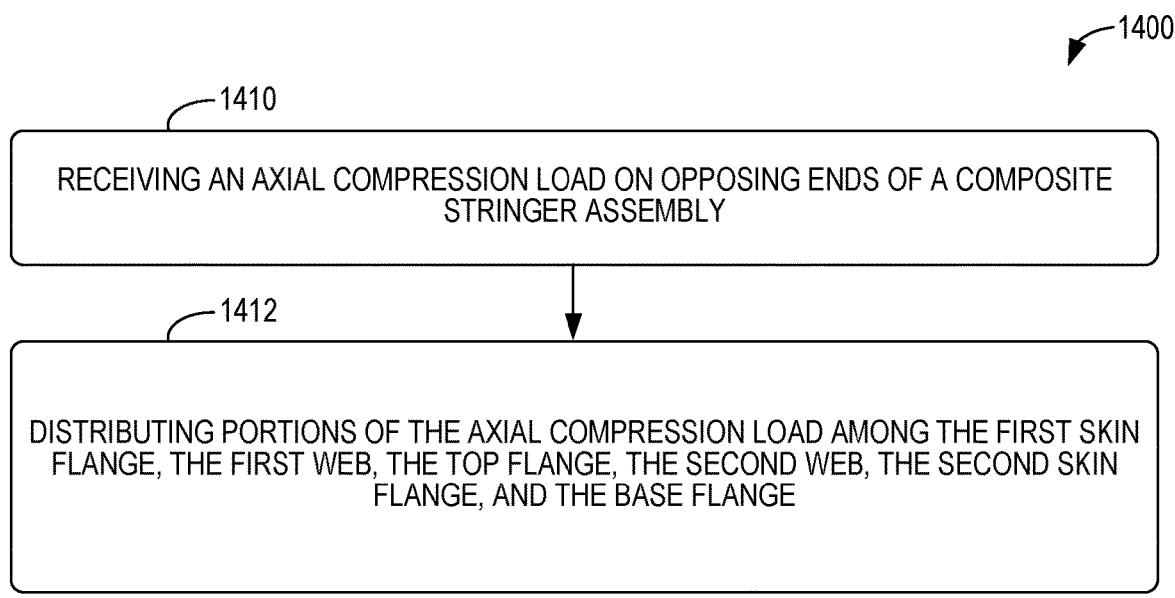
FIG. 14 depicts a process for transmitting an axial compression load through a composite stringer assembly, according to an example.

Referring now to FIG. 14, a flowchart for a process 1400 of transmitting an axial compression load through a composite stringer assembly. At block 1410, the process 1400 includes receiving an axial compression load on opposing ends of a composite stringer assembly. The composite stringer assembly includes a composite stringer and a base flange. The composite stringer includes: (i) a top flange having a first side and a second side, (ii) a first skin flange configured to be coupled to a support structure, (iii) a first web extending between the first skin flange and the first side of the top flange, (iv) a second skin flange configured to be coupled to the support structure, and (v) a second web extending between the second skin flange and the second side of the top flange. The support structure includes at least one of a skin of a vehicle or a base flange.

The base flange includes (a) a bottom surface extending between the first skin flange and the second skin flange, wherein the bottom surface of the base flange is coupled to the support structure, and (b) a top surface extending between the first web and the second web. The first skin flange, the first web, the top flange, the second web, the second skin flange, and the base flange include a plurality of plies of composite material.

At block 1412, the process 1400 also includes distributing a plurality of portions of the axial compression load among the first skin flange, the first web, the top flange, the second web, the second skin flange, and the base flange such that the first skin flange, the first web, the top flange, the second web, the second skin flange, and the base flange simultaneously carry the axial compression load together as an integrated structure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A composite stringer assembly, comprising:
    a composite stringer comprising:
        a top flange having a first side and a second side,
        a first skin flange configured to be coupled to a support structure, wherein the support structure comprises at least one of a skin of a vehicle or a base charge,
        a first web extending between the first skin flange and the first side of the top flange,
        a second skin flange configured to be coupled to the support structure, and
        a second web extending between the second skin flange and the second side of the top flange; and
    a base flange comprising:
        a bottom surface providing a continuous connection between the first skin flange and the second skin flange, wherein the bottom surface of the base flange is configured to be coupled to the support structure, and
        a top surface providing a continuous connection between the first web and the second web,
    wherein the first skin flange, the first web, the top flange, the second web, the second skin flange, and the base flange comprise a plurality of plies of composite material,
    wherein the first skin flange has a first gage, the first web has a second gage, the top flange has a third gage, the second web has a fourth gage, the second skin flange has a fifth gage, and the base flange has a sixth gage, and
    wherein the sixth gage of the base flange is greater than the first gage of the first skin flange and the fifth gage of the second skin flange.

2. The composite stringer assembly of claim 1, wherein the base flange is configured to transfer an in-plane shear load from the first skin flange to the second skin flange.

3. The composite stringer assembly of claim 1, wherein the third gage of the top flange is greater than the first gage of the first skin flange, the second gage of the first web, the fourth gage of the second web, and the fifth gage of the second skin flange.

4. The composite stringer assembly of claim 1, wherein the third gage of the top flange is greater than the sixth gage of the base flange.

5. The composite stringer assembly of claim 1, wherein the first gage of the first skin flange is approximately equal to the second gage of the first web, and
    wherein fourth gage of the second web is approximately equal to the fifth gage of the second skin flange.

6. The composite stringer of claim 1, further comprising:
    an inner surface extending along the first skin flange, the first web, the top flange, the second web, and the second skin flange, wherein the inner surface faces the support structure when the first skin flange and the second skin flange are coupled to the support structure; and
    an outer surface extending along the first skin flange, the first web, the top flange, the second web, and the second skin flange, wherein the outer surface faces away from the support structure when the first skin flange and the second skin flange are coupled to the support structure,
    wherein the first gage, the second gage, the third gage, the fourth gage, and the fifth gage are respective thicknesses between the inner surface and the outer surface at the first skin flange, the first web, the top flange, the second web, and the second skin flange, respectively, and
    wherein the sixth gage is a thickness between the top surface and the bottom surface of the base flange.

7. The composite stringer assembly of claim 1, wherein the composite stringer further comprises:
    a first lower corner portion extending from the first skin flange to the first web, and
    a second lower corner portion extending from the second skin flange to the second web, and
    wherein the base flange further comprises:
        a first lateral surface extending between the top surface and the bottom surface of the base flange, wherein the first lateral surface is coupled to the first lower corner portion of the composite stringer, and
        a second lateral surface extending between the top surface and the bottom surface of the base flange, wherein the second lateral surface is coupled to the second lower corner portion of the composite stringer.

8. The composite stringer assembly of claim 7, wherein the composite stringer further comprises:
an inner surface extending along the first skin flange, the first lower corner portion, the first web, the top flange, the second web, the second lower corner portion, and the second skin flange, wherein the inner surface faces the support structure when the first skin flange and the second skin flange are coupled to the support structure; and
an outer surface extending along the first skin flange, the first lower corner portion, the first web, the top flange, the second web, the second lower corner portion, and the second skin flange, wherein the outer surface faces away from the support structure when the first skin flange and the second skin flange are coupled to the support structure,
wherein, at the first lower corner portion and the second lower corner portion, the inner surface is defined by a radius of curvature, and
wherein the first lateral surface and the second lateral surface of the base flange are defined by the radius of curvature that defines the inner surface at the first lower corner portion and the second lower corner portion.

9. The composite stringer assembly of claim 1, wherein the base flange comprises at least ten plies of composite material.

10. The composite stringer assembly of claim 1, wherein the top surface and the bottom surface of the base flange are parallel to the skin of the vehicle.

11. The composite stringer assembly of claim 1, wherein an angle between the first skin flange and the first web is between approximately 50 degrees and approximately 80 degrees.

12. The composite stringer assembly of claim 1, wherein the support structure is the skin of the vehicle, and wherein the first skin flange, the base flange, and the second skin flange each have a respective stiffness that is approximately equal to a stiffness of the skin of the vehicle.

13. A method of transmitting an in-plane shear load through a composite stringer assembly, comprising:
transmitting, along a support structure, an in-plane shear load toward a composite stringer assembly coupled to the support structure, wherein the support structure comprises a skin of a vehicle, wherein the composite stringer assembly comprises:
a composite stringer comprising:
(i) a top flange having a first side and a second side,
(ii) a first skin flange coupled to the support structure,
(iii) a first web extending between the first skin flange and the first side of the top flange,
(iv) a second skin flange coupled to the support structure, and
(v) a second web extending between the second skin flange and the second side of the top flange; and
a base flange comprising:
(a) a bottom surface providing a continuous connection between the first skin flange and the second skin flange, wherein the bottom surface of the base flange is coupled to the support structure, and
(b) a top surface providing a continuous connection between the first web and the second web,
wherein the first skin flange, the first web, the top flange, the second web, the second skin flange, and the base flange comprise a plurality of plies of composite material,
wherein the first skin flange has a first gage, the first web has a second gage, the top flange has a third gage, the second web has a fourth gage, the second skin flange has a fifth gage, and the base flange has a sixth gage, and
wherein the sixth gage of the base flange is greater than the first gage of the first skin flange and the fifth gage of the second skin flange, and
transmitting at least a portion of the in-plane shear load continuously through the first skin flange, the base flange, and the second skin flange; and
transmitting at least another portion of the in-plane shear load through the support structure coupled to the first skin flange, the base flange, and the second skin flange.

14. The method of claim 13, wherein transmitting at least a portion of the in-plane shear load continuously through the first skin flange, the base flange, and the second skin flange comprises:
transmitting a first portion of the in-plane shear load through the first skin flange to the base flange while transmitting a second portion of the in-plane shear load through a portion of the support structure coupled to the first skin flange;
transmitting, from the first skin flange to the second skin flange, a third portion of the in-plane shear load through the base flange while transmitting a fourth portion of the in-plane shear load through a portion of the support structure coupled to the base flange; and
transmitting, from the base flange, a fifth portion of the in-plane shear load through the second skin flange while transmitting a sixth portion of the in-plane shear load through a portion of the support structure coupled to the second skin flange.

15. The method of claim 14, wherein a sum of the first portion of the in-plane shear load and the second portion of the in-plane shear load is approximately equal to (i) a sum of the third portion of the in-plane shear load and the fourth portion of the in-plane shear load and (ii) a sum of the fifth portion of the in-plane shear load and the sixth portion of the in-plane shear load.

16. The method of claim 15, wherein the first portion of the in-plane shear load that is transmitted through the first skin flange is approximately equal to the fifth portion of the in-plane shear load that is transmitted through the second skin flange, and
wherein the third portion of the in-plane shear load that is transmitted through the base flange is greater than the first portion of the in-plane shear load that is transmitted through the first skin flange.

17. The method of claim 15, wherein the sum of the first portion of the in-plane shear load and the second portion of the in-plane shear load is approximately equal to the in-plane shear load that is transmitted toward the composite stringer assembly.

18. The method of claim 13, wherein the composite stringer further comprises:
a first lower corner portion extending from the first skin flange to the first web, and
a second lower corner portion extending from the second skin flange to the second web, and
wherein the base flange further comprises:
a first lateral surface extending between the top surface and the bottom surface of the base flange, wherein the first lateral surface is coupled to the first lower corner portion of the composite stringer, and
a second lateral surface extending between the top surface and the bottom surface of the base flange, wherein the second lateral surface is coupled to the second lower corner portion of the composite stringer, and wherein transmitting at least a portion of the in-plane shear load continuously through the first skin flange, the base flange, and the second skin flange comprises:

transmitting the at least the portion of the in-plane shear load from the first skin flange to the base flange through an interface between the first lower corner portion of the composite stringer and the first lateral surface of the base flange, and transmitting the at least the portion of the in-plane shear load from the base flange to the second skin flange through an interface between the second lateral surface of the base flange and the second lower corner portion of the composite stringer.

19. A method of transmitting an axial compression load through a composite stringer assembly, comprising:

receiving an axial compression load on opposing ends of a composite stringer assembly, wherein the composite stringer assembly comprises:

a composite stringer comprising:
(i) a top flange having a first side and a second side,
(ii) a first skin flange configured to be coupled to a support structure wherein the support structure comprises at least one of a skin of a vehicle or a base flange,
(iii) a first web extending between the first skin flange and the first side of the top flange,
(iv) a second skin flange configured to be coupled to the support structure, and
(v) a second web extending between the second skin flange and the second side of the top flange; and a base flange comprising:
(a) a bottom surface providing a continuous connection between the first skin flange and the second skin flange, wherein the bottom surface of the base flange is coupled to the support structure,
(b) a top surface providing a continuous connection between the first web and the second web, wherein the first skin flange, the first web, the top flange, the second web, the second skin flange, and the base flange comprise a plurality of plies of composite material, wherein the first skin flange has a first gage, the first web has a second gage, the top flange has a third gage, the second web has a fourth gage, the second skin flange has a fifth gage, and the base flange has a sixth gage, and wherein the sixth gage of the base flange is greater than the first gage of the first skin flange and the fifth gage of the second skin flange; and distributing a plurality of portions of the axial compression load among the first skin flange, the first web, the top flange, the second web, the second skin flange, and the base flange such that the first skin flange, the first web, the top flange, the second web, the second skin flange, and the base flange simultaneously carry the axial compression load together as an integrated structure.

20. The method of claim 19, wherein the composite stringer further comprises:

a first lower corner portion extending from the first skin flange to the first web, and a second lower corner portion extending from the second skin flange to the second web, and wherein the base flange further comprises:

a first lateral surface extending between the top surface and the bottom surface of the base flange, wherein the first lateral surface is coupled to the first lower corner portion of the composite stringer, and a second lateral surface extending between the top surface and the bottom surface of the base flange, wherein the second lateral surface is coupled to the second lower corner portion of the composite stringer, and wherein the method further comprises transmitting at least a portion of an in-plane shear load continuously through the first skin flange, the base flange, and the second skin flange comprises:

transmitting the at least the portion of the in-plane shear load from the first skin flange to the base flange through an interface between the first lower corner portion of the composite stringer and the first lateral surface of the base flange, and transmitting the at least the portion of the in-plane shear load from the base flange to the second skin flange through an interface between the second lateral surface of the base flange and the second lower corner portion of the composite stringer.

* * * * *